US011676182B2

(12) United States Patent
Frei et al.

(10) Patent No.: US 11,676,182 B2
(45) Date of Patent: Jun. 13, 2023

(54) COMPUTER VISION SYSTEMS AND METHODS FOR AUTOMATICALLY DETECTING, CLASSIFYING, AND PRICING OBJECTS CAPTURED IN IMAGES OR VIDEOS

(71) Applicant: Insurance Services Office, Inc., Jersey City, NJ (US)

(72) Inventors: Matthew David Frei, Lehi, UT (US); Sam Warren, Salt Lake City, UT (US); Caroline McKee, Salt Lake City, UT (US); Bryce Zachary Porter, Lehi, UT (US); Dean Lebaron, Pleasant Grove, UT (US); Nick Sykes, American Fork, UT (US); Kelly Redd, Orem, UT (US)

(73) Assignee: Insurance Services Office, Inc., Jersey City, NJ (US)

( * ) Notice: Subject to any disclaimer, the term of this patent is extended or adjusted under 35 U.S.C. 154(b) by 0 days.

(21) Appl. No.: 17/162,755

(22) Filed: Jan. 29, 2021

(65) Prior Publication Data

US 2021/0201039 A1 Jul. 1, 2021

Related U.S. Application Data

(63) Continuation-in-part of application No. 16/458,857, filed on Jul. 1, 2019.

(Continued)

(51) Int. Cl.
*G06V 20/40* (2022.01)
*G06Q 30/0283* (2023.01)
(Continued)

(52) U.S. Cl.
CPC .............. *G06V 20/41* (2022.01); *G06N 3/08* (2013.01); *G06Q 30/0283* (2013.01); *G06V 20/10* (2022.01)

(58) Field of Classification Search
CPC ........ G06V 20/52; G06V 20/41; G06V 20/44; G06V 10/235; G06V 40/172; G06V 20/20;
(Continued)

(56) References Cited

U.S. PATENT DOCUMENTS 9,996,890 B1 6/2018 Cinnamon et al.
2006/0080265 A1 4/2006 Hinds et al.
(Continued)

FOREIGN PATENT DOCUMENTS

CN 107833213 A 3/2018

OTHER PUBLICATIONS

International Search Report of the International Searching Authority dated Sep. 20, 2019, issued in connection with International Application No. PCT/US2019/40106 (3 pages).
(Continued)

*Primary Examiner* — Ajibola A Akinyemi
(74) *Attorney, Agent, or Firm* — McCarter & English, LLP

(57) ABSTRACT

Systems and methods for automatically detecting, classifying, and processing objects captured in an images or videos are provided. In one embodiment, the system receives an image from an image source and detects one or more objects in the image. The system performs a high-level classification of the one or more objects in the image. The system performs a specific classification of the one or more objects, determines a price of the one or more objects, and generates a pricing report comprising a price of the one or more objects. In another embodiment, the system captures at least one image or video frame and classifies an object present in the image or video frame using a neural network. The system (Continued)

adds the classified object and an assigned object code to an inventory and processes the inventory to assign the classified object a price.

19 Claims, 33 Drawing Sheets

Related U.S. Application Data

(60) Provisional application No. 62/691,777, filed on Jun. 29, 2018.

(51) Int. Cl.
*G06N 3/08* (2023.01)
*G06V 20/10* (2022.01)

(58) Field of Classification Search
CPC ........ G06V 10/82; G06V 10/95; G06V 20/49; G06V 10/96; G06V 40/103; G06V 40/155; G06V 40/169; G06V 40/70; G06V 10/143; G06V 10/24; G06V 10/25; G06V 10/40; G06V 20/188
USPC .......................................................... 382/190
See application file for complete search history.

(56) References Cited

U.S. PATENT DOCUMENTS

| | | | |
|---|---|---|---|
| 2006/0235875 A1 | 10/2006 | Wen et al. | |
| 2015/0248589 A1 | 9/2015 | Broache et al. | |
| 2016/0086029 A1* | 3/2016 | Dubuque | G06K 9/6267 |
| | | | 382/159 |
| 2016/0140424 A1 | 5/2016 | Wang et al. | |
| 2016/0171622 A1 | 6/2016 | Perkins et al. | |
| 2016/0342863 A1 | 11/2016 | Kwon et al. | |
| 2016/0358632 A1 | 12/2016 | Lakhani et al. | |
| 2017/0132686 A1* | 5/2017 | Kim | G06F 16/583 |
| 2017/0177969 A1 | 6/2017 | Zaremski et al. | |
| 2017/0331937 A1* | 11/2017 | Tsao | H04M 1/72469 |
| 2018/0114087 A1 | 4/2018 | Kamen et al. | |
| 2019/0258876 A1 | 8/2019 | Liu et al. | |
| 2020/0005075 A1 | 1/2020 | Porter et al. | |

OTHER PUBLICATIONS

Written Opinion of the International Searching Authority dated Sep. 20, 2019, issued in connection with International Application No. PCT/US2019/40106 (7 pages).

Office Action dated Jun. 8, 2021, issued in connection with U.S. Appl. No. 16/458,827 (10 pages).

Fang, et al., "Fine-Grained Vehicle Model Recognition Using a Course-to-Fine Convolutional Neural Network Architecture," IEEE Transactions on Intelligent Transportation Systems, vol. 18, No. 7, Jul. 2017 (11 pages).

HomeZada Home Inventory Videos and Inventory Recognition AI, Nov. 29, 2018, retrieved from https://www.youtube.com/watch?v=zn3g39ydnpo (1 page).

Bell, et al., "Learning Visual Similarity for Product Design with Convolutional Neural Networks," ACM Transactions on Graphics, vol. 34, No. 45, Article 98, Aug. 2015 (10 pages).

Extended European Search Reported dated Jul. 15, 2021, issued by the European Patent Office issued in connection with European Application No. 19826155.4 (9 pages).

Office Action dated Feb. 25, 2022, issued in connection with U.S. Appl. No. 16/458,827 (12 pages).

International Search Report of the International Searching Authority dated Apr. 12, 2022, issued in connection with International Application No. PCT/US2022/14207 (3 pages).

Written Opinion of the International Searching Authority dated Apr. 12, 2022, issued in connection with International Application No. PCT/US2022/14207 (6 pages).

Office Action dated Aug. 30, 2022, issued in connection with U.S. Appl. No. 16/458,827 (12 pages).

* cited by examiner

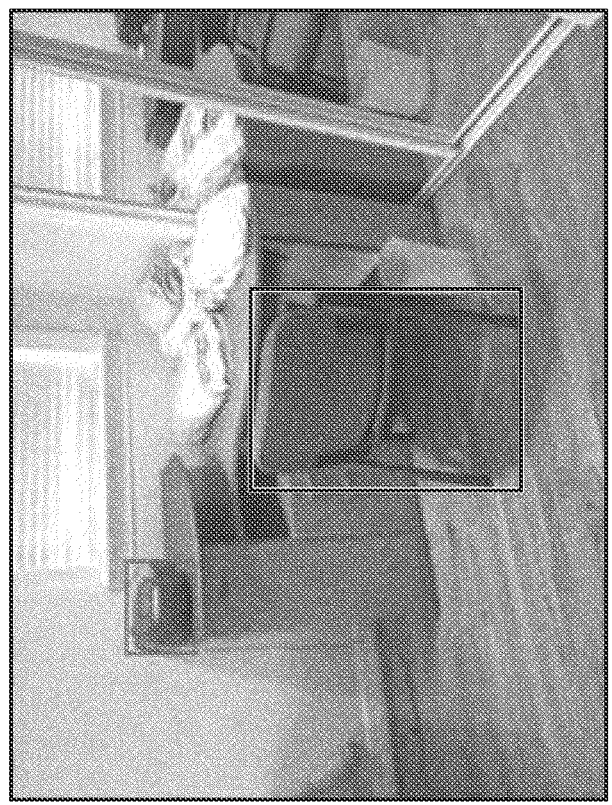
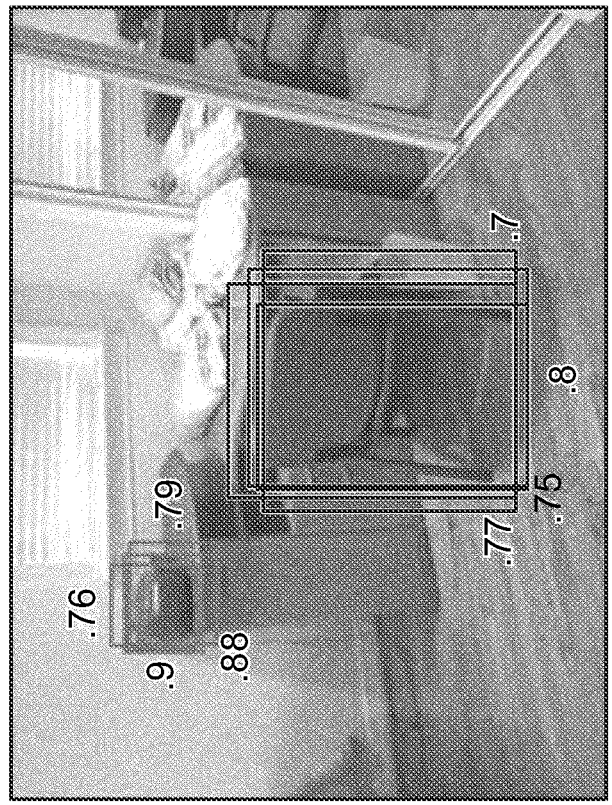
FIG. 5

Generic Insurance Company Inc
Pricing Estimate
Propriet 123 W 500 S, Someplace, USA  
Date: 1/1/2018  
John Doe
| Quantity | Item | | Confidence | Best Price | Unit Total |
|---|---|---|---|---|---|
| 1 |  | Digby Conversation Model | .8 | 250 | 250.00 |
| 1 |  | Ashley Pinewood Dining Table | .66 | 800 | 800.00 |
| 1 |  | Panasonic 20" Picture Tube TV | .85 | 50 | 50.00 |
| 2 |  | Basset Alex Fabric Chair | .50 | 310 | 620.00 |
| | | | | Subtotal | $1670.00 |
| | | | | Sales Tax | $116.90 |
| | | | | Total | $1786.90 |
FIG. 11

Project | Claim Info | Sketch | Estimate Items | Complete
Items | Components | Supporting Events | Labor Minimums | Labor Summary Grouping + Add

| Group | Filter (Off) | Subtotal | # Items |
|---|---|---|---|
| ▲ asdfwfewe | | | |
| ▲ Inventory Import (INVENTORY_IM) | | | |
| ▲ Main (MAIN) | | | |
| Bathroom (BATHROOM) | | $1,254.98 | 16 |
| Bedroom (BEDROOM) | | $7.96 | 1 |
| Kitchen (KITCHEN) | | $1,307.11 | 17 |
| Office (OFFICE) | | $2,822.02 | 13 |

Search

Home > Price List > Reference ▼ | Search | Filter: ▼

Similar | Related

Search | Macros

Quick Entry

Misc. | Item | Attachments | Salvage/Restored | OK | Cancel

Cat: [CAP] ▼  Sel: [MW] ▼  Act: [+] [-]  Variations ▼
Desc: microwave
Calc: [60] [⌨] - 60.00  @ [15.95]  [EA] ▼  - $957.00
Cov: Contents ▼  ☐ Replacement
Depr: Age/Condition ▼  Age [0.00] ▼  ☑ Recoverable
Condition: Average ▼

Item Image
Click for Detail

Tags
Unit Price
Amounts
Depreciation

| # | Cat | Sel | Act | Notes | Description | Coverage | Calc | Quantity | Unit | Unit Price | Sales Tax | RCV | Depreciation | ACV | |
|---|---|---|---|---|---|---|---|---|---|---|---|---|---|---|---|
| 1 | CAP | MW | + | 4 | microwave | Contents | 60 | 60 | EA | $15.95 | $0.00 | $957.00 | ($0.00) | $957.00 | ⊘ |
| 3 | CAP | MWX | + | 1 | microwave | Contents | 1 | 1 | EA | $10.04 | $0.00 | $10.04 | ($0.00) | $10.04 | ⊘ |
| 4 | CAP | RFX | + | 1 | refrigerator | Contents | 1 | 1 | EA | $15.99 | $0.00 | $15.99 | ($0.00) | $15.99 | ⊘ |
| 5 | CEL | TV | + | 1 | television | Contents | 1 | 1 | EA | $14.78 | $0.00 | $14.78 | ($0.00) | $14.78 | ⊘ |
| 6 | CGN | PLNT- | + | 1 | plant | Contents | 1 | 1 | EA | $3.60 | $0.00 | $3.60 | ($0.00) | $3.60 | ⊘ |
| 7 | CHF | CHD- | + | 1 | chair - dining | Contents | 15 | 15 | EA | $5.52 | $0.00 | $82.80 | ($0.00) | $82.80 | ⊘ |
| 8 | CHF | PNO< | + | 1 | piano - console (upright) | Contents | 1 | 1 | EA | $53.17 | $0.00 | $53.17 | ($0.00) | $53.17 | ⊘ |
| 9 | CHF | PNOST | + | 1 | piano stool | Contents | 1 | 1 | EA | $6.28 | $0.00 | $6.28 | ($0.00) | $6.28 | ⊘ |
| 10 | CHF | TABC- | + | 1 | table - coffee | Contents | 1 | 1 | EA | $9.40 | $0.00 | $9.40 | ($0.00) | $9.40 | ⊘ |
| 11 | CHF | TABC- | + | 1 | table - coffee | Contents | 1 | 1 | EA | $9.40 | $0.00 | $9.40 | ($0.00) | $9.40 | ⊘ |
| 12 | CHF | TABD- | + | 1 | table - dining | Contents | 1 | 1 | EA | $12.70 | $0.00 | $12.70 | ($0.00) | $12.70 | ⊘ |
| 13 | CLM | TLC | + | 1 | table lamp - crystal (no shade) | Contents | 1 | 1 | EA | $32.23 | $0.00 | $32.23 | ($0.00) | $32.23 | ⊘ |
| 14 | CMP | KEYBD | + | 1 | keyboard | Contents | 1 | 1 | EA | $0.00 | $0.00 | $0.00 | ($0.00) | $0.00 | ⊘ |
| 15 | CUP | SOFAL- | + | 1 | sofa - leather | Contents | 1 | 1 | LF | $24.09 | $0.00 | $24.09 | ($0.00) | $24.09 | ⊘ |
| 16 | CWH | WHCL | + | 1 | wall hanging - clock | Contents | 1 | 1 | EA | $23.50 | $0.00 | $23.50 | ($0.00) | $23.50 | ⊘ |
| 17 | USR | MISC | + | | Blender | Contents | 10 | 10 | EA | $0.00 | $0.00 | $0.00 | ($0.00) | $0.00 | ⊘ |

Language: English

FIG. 24 (Cont.)

COMPUTER VISION SYSTEMS AND METHODS FOR AUTOMATICALLY DETECTING, CLASSIFYING, AND PRICING OBJECTS CAPTURED IN IMAGES OR VIDEOS

RELATED APPLICATIONS

This application is a continuation-in-part of, and claims the benefit of priority to, U.S. patent application Ser. No. 16/458,827 filed on Jul. 1, 2019, which claims priority to U.S. Provisional Patent Application No. 62/691,777 filed on Jun. 29, 2018, each of which is expressly incorporated herein by reference.

BACKGROUND

Technical Field

The present disclosure relates generally to the field of computer vision. More specifically, the present disclosure relates to computer visions systems and methods for automatically detecting, classifying, and pricing objects captured in images or videos.

Related Art

Accurate and rapid identification and depiction of objects from digital images (e.g., aerial images, smartphone images, etc.) and video data is increasingly important for a variety of applications. For example, information related to properties and structures thereon (e.g., buildings) is often used by insurance adjusters to determine the proper costs for insuring homes and apartments. Further, in the home remodeling industry, accurate information about personal property can be used to determine the costs associated with furnishing a dwelling.

Various software systems have been developed for processing images to identify objects in the images. Computer visions systems, such as convolutional neural networks, can be trained to detect and identify different kinds of objects. For example, key point detectors may yield numerous key point candidates that must be matched against other key point candidates from different images.

Currently, professionals such as insurance adjusters need to manually determine or "guesstimate" the value of a person's possessions. This is a time-consuming and mistake-ridden process that could lead to inaccurate insurance estimates. As such, the ability to quickly detect and/or classify objects in a location and determine their value is a powerful tool for insurance and other professionals. Accordingly, the computer vision systems and methods disclosed herein solve these and other needs by providing a robust object detection, classification, and identification system.

SUMMARY

The present disclosure relates to computer vision systems and methods for automatically detecting, classifying, and pricing objects captured in images or videos. In one embodiment, the system first receives one or more images or video data. For example, the images or video data can be received from an insurance adjuster (or other person/entity) taking photos and/or videos using a smartphone. The system then detects and classifies the objects in the images and/or video data. The detecting and classifying steps can be performed by the system using a convolutional neural network. Next, the system extracts the objects from the images or video data. The system then classifies each of the detected objects. For example, the system compares the detected objects to images in a database in order to classify the objects. Next, the system determines the price of the detected object. Lastly, the system generates a pricing report. The pricing report can include the detected and classified objects, as well as a price for each object.

In another embodiment, the system captures at least one image or video frame from a video including an object, which can be a live camera feed generated by a mobile device. The system classifies an object present in the at least one captured video frame using a neural network and adds the classified object to an inventory. Such classification can be performed on the mobile device in real-time or near-real-time. The system generates a set of fine-grained object codes related to the classified object and assigns at least one fine-grained object code to the classified object based on a user input and/or automatically (without user intervention). The system transmits the inventory to a server and the server processes the inventory to assign the classified object a predetermined price.

BRIEF DESCRIPTION OF THE DRAWINGS

The foregoing features of the invention will be apparent from the following Detailed Description of the Invention, taken in connection with the accompanying drawings, in which:

FIG. 5 is a diagram illustrating a process for selecting a bounding box from several overlapping bounding boxes via the non-maximal suppression method;

FIG. 11 is a photo showing an example of a pricing report capable of being generated by the system;

FIG. 24 is a screenshot illustrating a web application in accordance with the system of FIG. 13;

DETAILED DESCRIPTION

The present disclosure relates to computer vision systems and methods for automatically detecting, classifying, and pricing objects captured in images or video, as described in detail below in connection with FIGS. 1-30.

Figure 1:
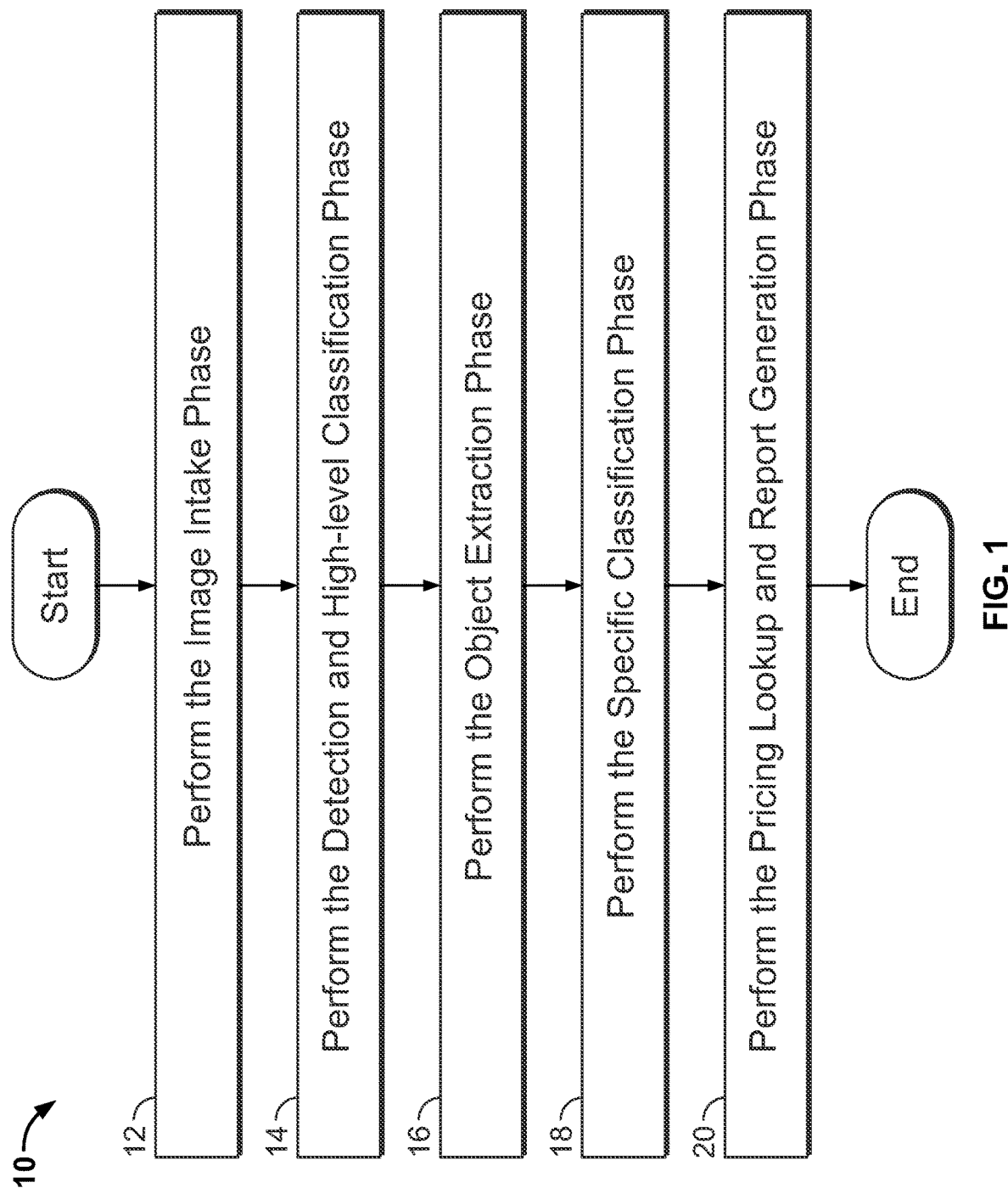
FIG. 1 is a flowchart illustrating overall process steps carried out by an embodiment of the system of the present disclosure.

FIG. 1 is a flowchart illustrating the overall process steps carried out by the system, indicated generally at 10. In step 12, the system performs an image intake phase. During the image intake phase, the system receives an input of one or more images, and/or video data. The one or more images and/or video data can relate to a single project or multiple projects. In a first example, a user, such as an insurance adjuster performing an on-site estimate, can take several photos (e.g., images) and/or video of an area with a mobile phone, a tablet, etc. The user can then upload the photos and/or video into the system for processing. The processing, which will be described in greater detail below, generates a pricing report, which can include an interactive pricing estimate of the objects detected in the photo(s) and/or video.

In step 14, the system performs a detection and high level classification phase. Specifically, the system detects and classifies one or more objects in the image (or a video frame) into high-level object categories. By way of example, the system can detect and classify the objects in the image or video using a convolutional neural network ("CNN"), such as a single shot detector ("SSD") network. It should be understood that the system can also use single shot object detection models including, but not limited to, EfficientDet, Yolo, ResNet, MaskRCNN, RetinaNet, and AmoebaNet embedded on a mobile device (e.g. a smartphone or table) or hosted behind an application programming interface (API) endpoint on a server. The CNN can process the image (or the video frame) and apply a bounding box to one or more objects detected in the image (or the video frame). Each object detected can be labeled. For example, if the image contains a desk, a chair and a radio, the CNN can detect and label the desk, the chair and the radio.

It should be understood that the process of step 14 can be applied to each image and to any video data received during the image intake phase. Regarding the video data, the system can sample the video data and extract frames. For example, the system can use a sampling rate such that every third frame is exacted from the video data and processed. Those skilled in the art would understand that other methods and systems to detect and classify the objects can be used during the detection and high-level classification phase, such as, but not limited to, further CNN types.

In step 16, the system performs an object extraction phase. Specifically, the system, extracts one or more detected object from the image(s). In step 18, the system performs a specific classification phase. Specifically, the system determines a specific make, model, etc. of the extracted object(s). In step 20, the system performs a pricing lookup and report generation phase. Specifically, the system determines the price of the extracted object(s) and generates a pricing report for the user. Steps 14-20 will be explained in greater detail below.

Figure 2:
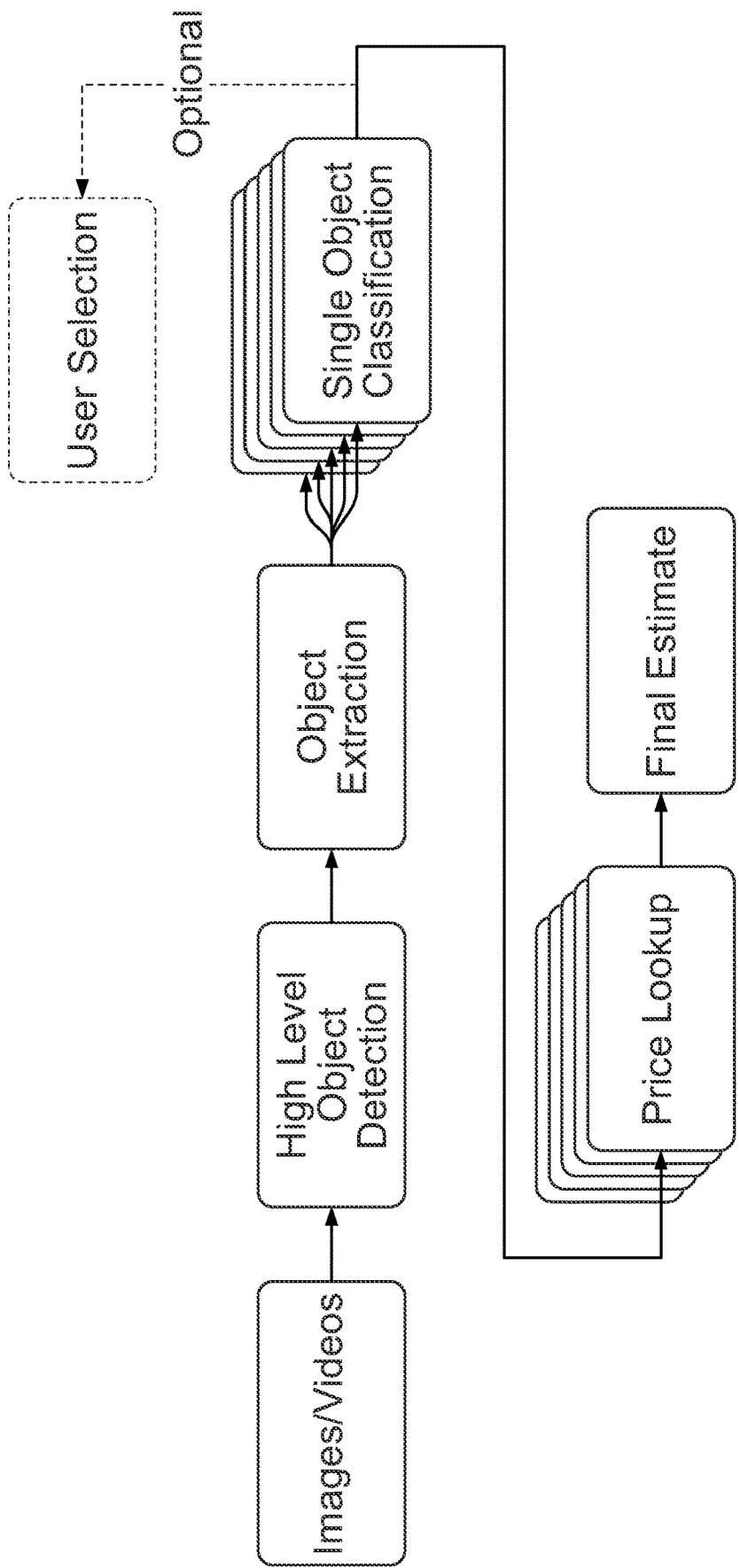
FIG. 2 is a diagram illustrating the processing steps of FIG. 1.

FIG. 2 is a diagram illustrating the processing steps discussed in connection with FIG. 1. As can be seen, multiple object classification processes can be executed in parallel, in order to speed up detection and classification of objects in images/videos by the system. Also, as can be seen, the user can, optionally, manually select one or more objects in the images/videos for classification and/or price lookup. The process steps of the invention disclosed herein could be embodied as computer-readable software code executed by one or more computer systems, and could be programmed using any suitable programming languages including, but not limited to, C, C++, C#, Java, Python or any other suitable language. Additionally, the computer system(s) on which the present disclosure can be embodied includes, but is not limited to, one or more personal computers, servers, mobile devices, cloud-based computing platforms, etc., each having one or more suitably powerful microprocessors and associated operating system(s) such as Linux, UNIX, Microsoft Windows, MacOS, etc. Still further, the invention could be embodied as a customized hardware component such as a field-programmable gate array ("FPGA"), application-specific integrated circuit ("ASIC"), embedded system, or other customized hardware component without departing from the spirit or scope of the present disclosure.

Figure 3:
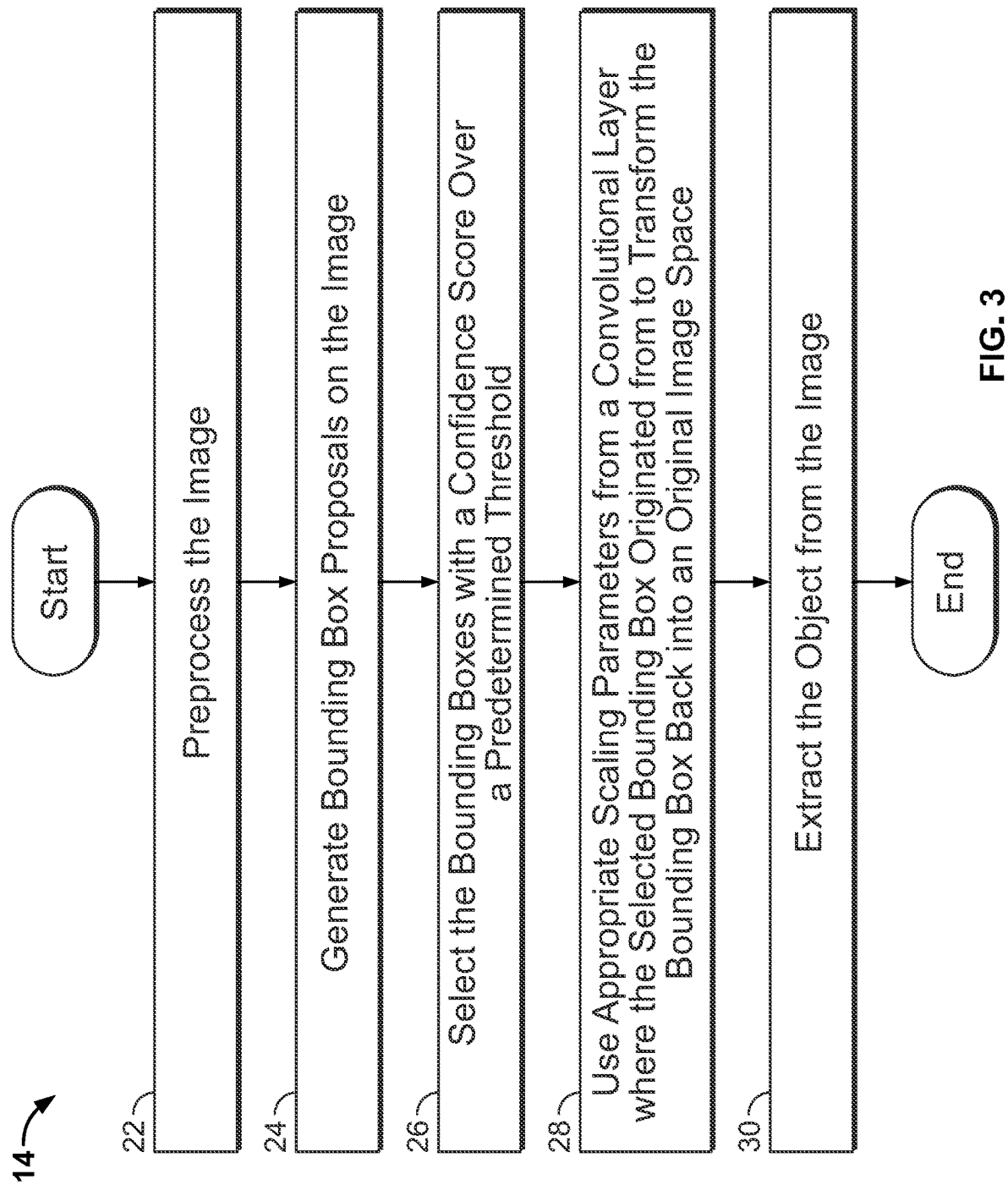
FIG. 3 is a flowchart illustrating step 14 of FIG. 1 in greater detail.

FIG. 3 is a flowchart illustrating steps 14 and 16 of FIG. 1 in greater detail. In particular, FIG. 3 illustrates process steps performed during the detection and high-level classification phase and during the object extraction phase. It should first be noted that during the detection and high-level classification phase, the system can use a CNN to detect one or more objects (e.g., chairs, desks, radios, etc.). For example, a feature extractor of the SSD network can be used. The feature extractor can be implemented as a fully convolutional neural network, such as a ResNet-100 or VGG16, where additional convolutional layers can be learned while the SSD network is trained. However, prior to the system using the feature extractor, the image may need to be preprocessed, depending on the feature extractor to be used.

In step 22, the system preprocesses the image to generate a preprocessed image. In an example, a normalization process or a channel value centering process can be performed on the image to prepare the image for the feature extractor. For example, the VGG16 network can perform channel centering by subtracting, from the image, mean RGB values from training images. Such preprocessing can increase the speed and/or accuracy of object detection and classification performed by the system. As discussed above, different feature extractors can require different image preprocessing. However, it should be understood that some feature extractors may not require any image preprocessing and, therefore, the detection and high-level classification phase can begin at step 24.

Figures 4A, 4B:
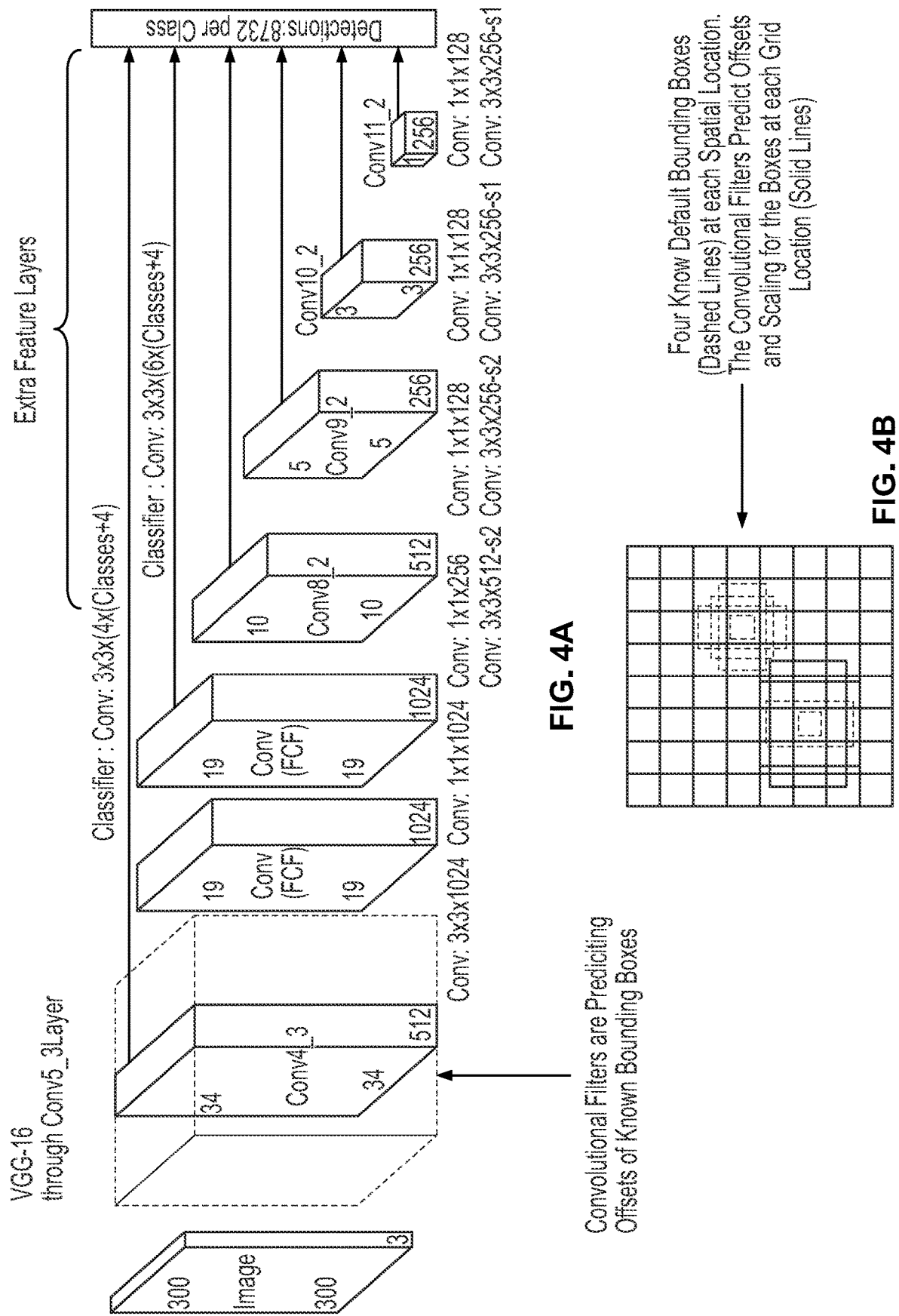
FIGS. 4A-4B are diagrams illustrating a process for predicting offset bounding boxes.

In step 24, the system generates bounding box proposals on the preprocessed image (or image if there is no need for the image to be preprocessed). Specifically, the system runs the image through a feature extractor. In an example, using the SSD network, the feature extractor generates feature maps at various scales. The feature maps at the various scales correspond to different amounts of down sampling of the image. Next, a bounding box localization process runs over the various scales. At each scale, one or more bounding boxes and a class are proposed. The bounding boxes and the class are assigned a level of confidence. The bounding boxes can be proposed as offsets from a set of known bounding boxes called "default boxes". For example, as illustrated in FIG. 4A, at the "Cony 4" layer, a set of four default boxes are encoded with an x,y location (a height and a width). The default boxes are then tilted across an entire input to form a grid, which is illustrated in FIG. 4B. Next, a convolutional filter is learned. The convolutional filter estimates a respective x, y height and width offsets that best match ground truth boxes. This process can be used to generate similar bounding boxes at subsequent downscaled layers, which allows the SSD network to predict various sized bounding boxes in the image. The filters can produce many (e.g., hundreds, thousands, etc.) of proposed bounding boxes with classifications.

In step 26, the system selects the bounding boxes with a confidence score over a predetermined threshold. As discussed above, each of the bounding boxes (e.g., a proposed detection of an object) has a confidence level. The system will keep the bounding boxes that have a confidence score above a predetermined threshold value. For example, bounding boxes with a confidence score of 0.7 or higher are kept and bounding boxes with a confidence score below 0.7 can be discarded. In an example, several overlapping bounding boxes can remain. For example, multiple convolution filters can pick offsets for their corresponding default box and produce roughly a same proposed object detection. In such an example, a non-maximal suppression method can be used to select a single proposed detection (e.g., a single bounding box). In an example, an algorithm is used to select the bounding box with the highest confidence score in a neighborhood of each bounding box. The size of the neighborhood is a parameter of the algorithm and can be set, for example, to a fifty percent overlap. FIG. 5 illustrates selection by the system of a bounding box from several overlapping bounding boxes via the non-maximal suppression method.

Figure 6:
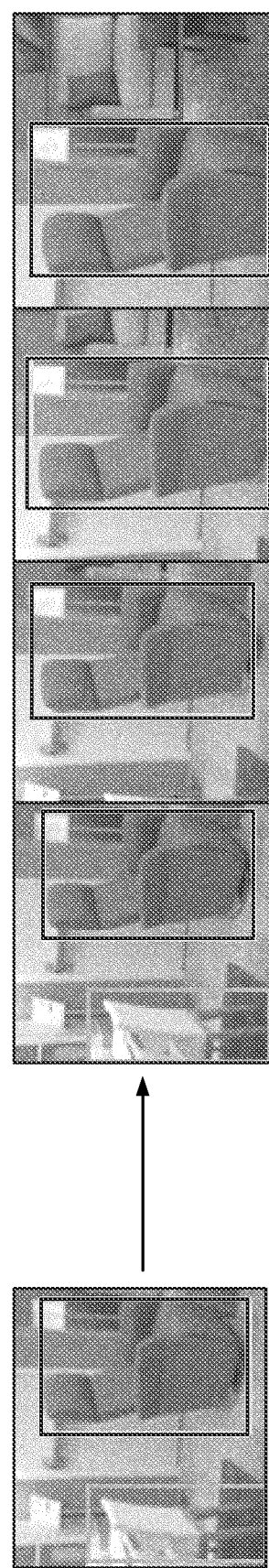
FIG. 6 is a diagram illustrating a newly detected object being discovered in a video stream.

In step 28, the system uses appropriate scaling parameters from a convolutional layer where a selected bounding box originated to transform the bounding box back into an original image space. In step 30, an object bound by the bounding box is extracted from the image during the object extraction phase. It should be understood that this process can be performed for each object found in each image or video frame. Each object extracted can be referred to as a "proposed line item". In a first example, where the object is in a single image, the system extracts the object by cropping out the bounding box. In a second example, where the object is in a video input, the object can appear over multiple video frames. In such a case, the system can track the object to ensure that the object only appears as a single proposed line item. A tracking algorithm, such as the Kernelized Correlation Filters ("KCF") or DEEP Sort, can be used to track the object across the multiple frames. Using a first frame of video, the bounding boxes determined in the object detection and high-level classification phase are used to seed the tracking algorithm with a one or more initial bounding boxes. The algorithm then tracks the object(s) with an internal representation of the object(s) being tracked. The internal representations are updated over time by the algorithm. After every n number of frames, if a new object is detected, the system can execute the object detection and high-level classification phase again to reinitialize the tracker with a newly detected object. FIG. 6 is a diagram illustrating a newly detected object being discovered in a video stream.

Figure 7:
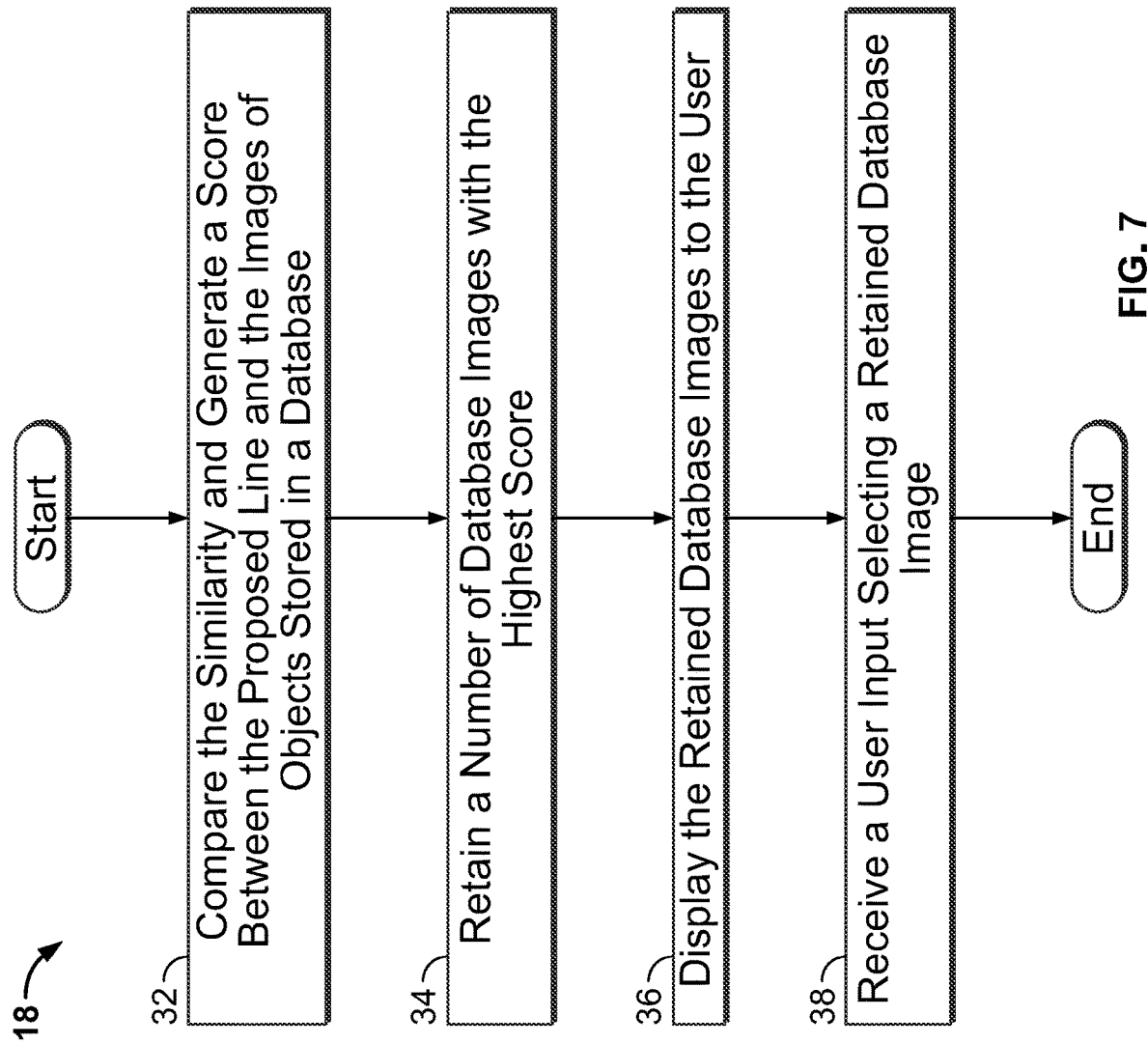
FIG. 7 is a flowchart illustrating steps 16 and 18 of FIG. 1 in greater detail.
Figure 8:
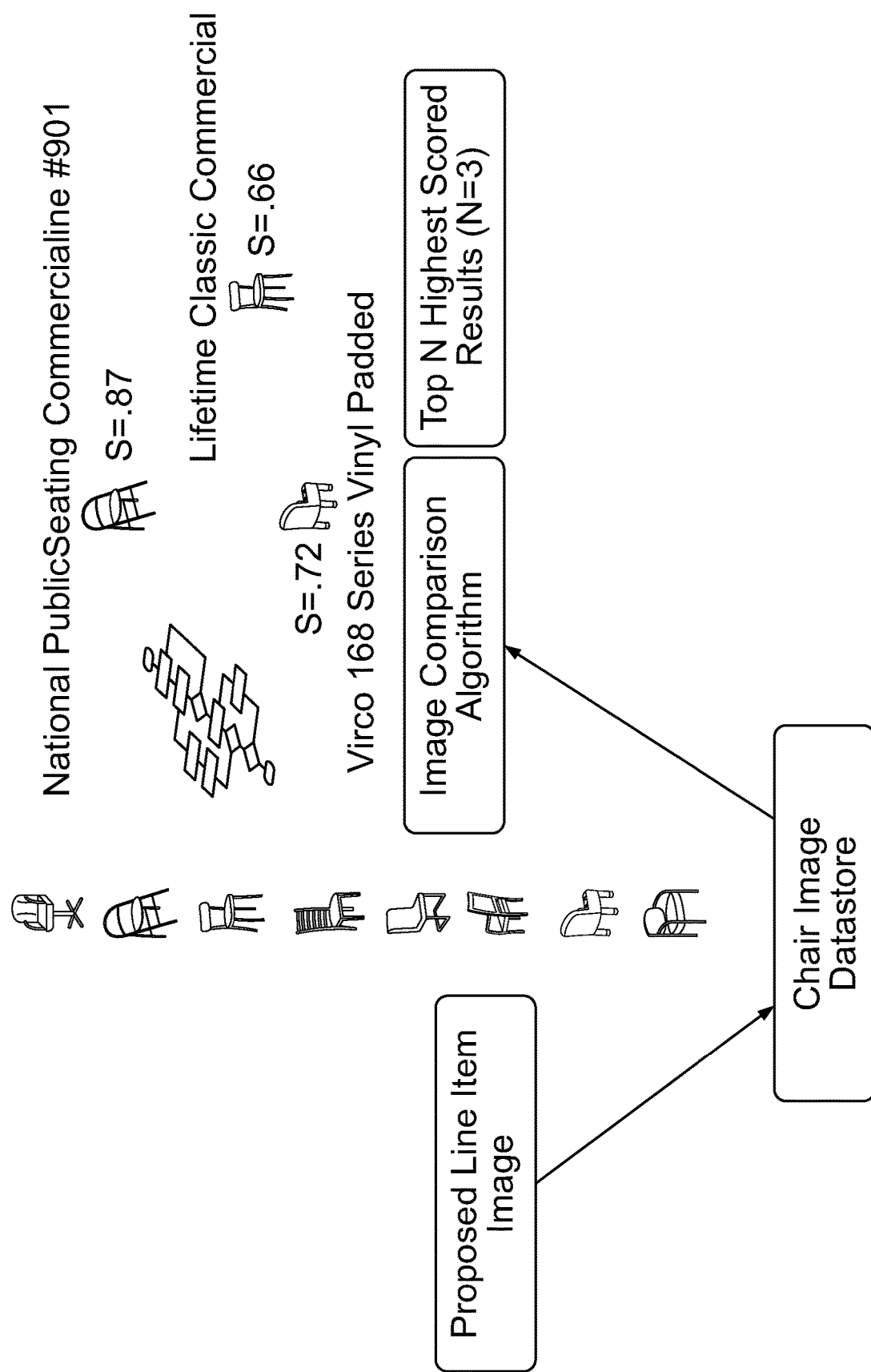
FIG. 8 is a diagram illustrating the process for specific classification.

FIG. 7 is a flowchart illustrating step 18 of FIG. 1 in greater detail. In particular, FIG. 7 illustrates process steps performed during the specific classification phase. In step 32, the system compares a similarity and generates a score between the proposed line item and images of objects stored in a database. Each image of an object stored in the database can have an assigned make, model, price, etc. In an example, a key point matching algorithm is used to generate the score. The algorithm first creates several key point descriptors at relevant locations on the proposed line item image and on a database image. The descriptors can be scale-invariant feature transform ("SIFT") descriptors, histogram of oriented gradients ("HoG") descriptors, or KAZE descriptors. The system then compares the descriptors on the proposed line item image and on the database image to identify matching points. The database images can be rotates, skewed, contrast adjusted, etc. to account for variations in the proposed line item image. Each database image can be assigned a similarity score. FIG. 8 is a diagram illustrating the process for specific classification.

Figure 9:
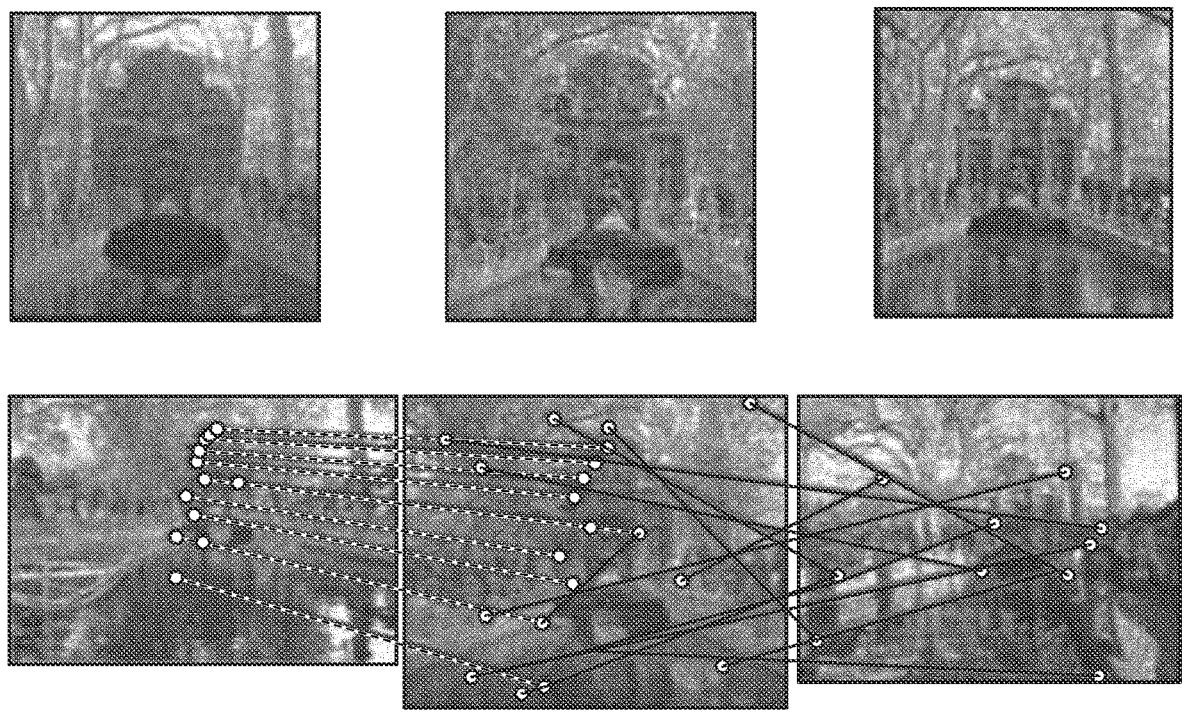
FIG. 9 is a diagram illustrating an example of SIFT matching versus locally weighted key point matching.

It should be noted that the key point descriptors excel at detecting similarities at a raw pixel level, but struggle when there are several local changes. In this regard, the embedding space approach, discussed in further detail below, may be advantageous. Additionally, to match the proposed line item image and the database images at a broader scale, e.g., object matching instead of pixel matching, other approaches can be used. For example, rather than weighing each key point descriptor uniformly when calculating a final similarity score, local changes are considered by determining a uniqueness of each key point descriptor. The system then weighs the key point descriptors and assigns a similarity score. FIG. 9 is a diagram illustrating an example of SIFT matching versus locally weighted key point matching.

In step 34, the system retains a number of database images with the highest similarity scores. The number can be a predefined amount or a user selected amount. In step 36, the system displays the retained database images to the user for a selection. In step 38, the user selects an image from the retained database images. In an example, the system can select a retained database image with the highest similarity score rather than use a user input. In a further example, when the similarity scores for a proposed line item fall below a threshold value, the object can be considered as unlabeled. In such an example, a manual pricing can be performed. It should be understood that this process can be performed for every proposed line item to select a comparable object.

Figure 10:
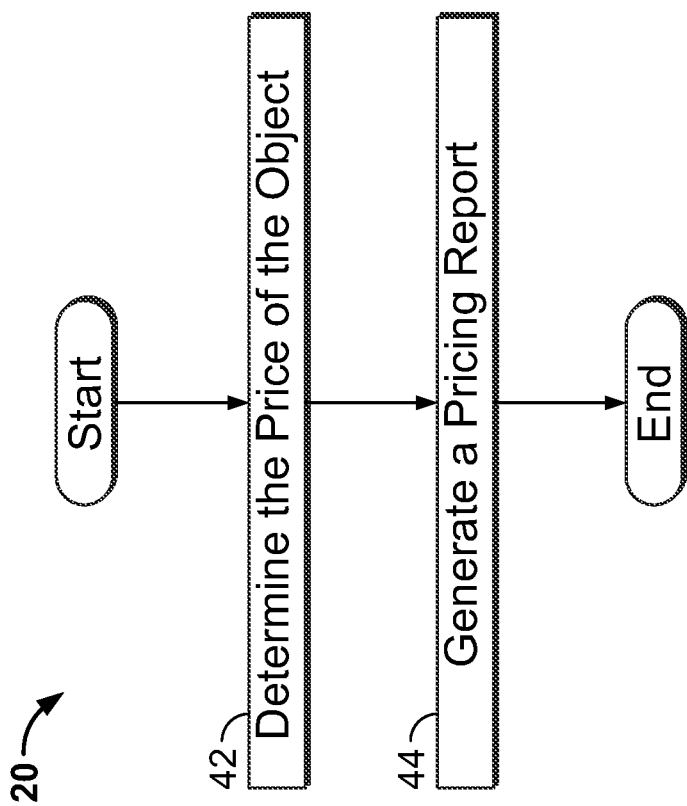
FIG. 10 is a flowchart illustrating step 20 of FIG. 1 in greater detail.

FIG. 10 is a flowchart illustrating step 20 of FIG. 1 in greater detail. In particular, FIG. 10 illustrates process steps performed during the pricing lookup and report generation phase. In step 42, the system determines the price of the comparable object. In an example, the system can determine the price of the object via a database. The database can consist of multiple entries for the object. The multiple entries can be from different retailers, different wholesales, etc. In another example, the system can determine the price of the object via the internet. In the case of multiple entries, the user can have the option to select a price given a list of options, select to use prices from a single retailer, etc.

In step 44, the system generates a pricing report. The pricing report can include a view of one or more of each line item identified, each comparable object, the estimate price, the source of the pricing data, a quantity, etc. The pricing report can further include the confidence scores, the similarity scores, etc. The report can be interactive to allow the user to add or remove line items, change a quantity, add notes, etc. FIG. 11 is a photo showing an example of a pricing report.

Figure 12:
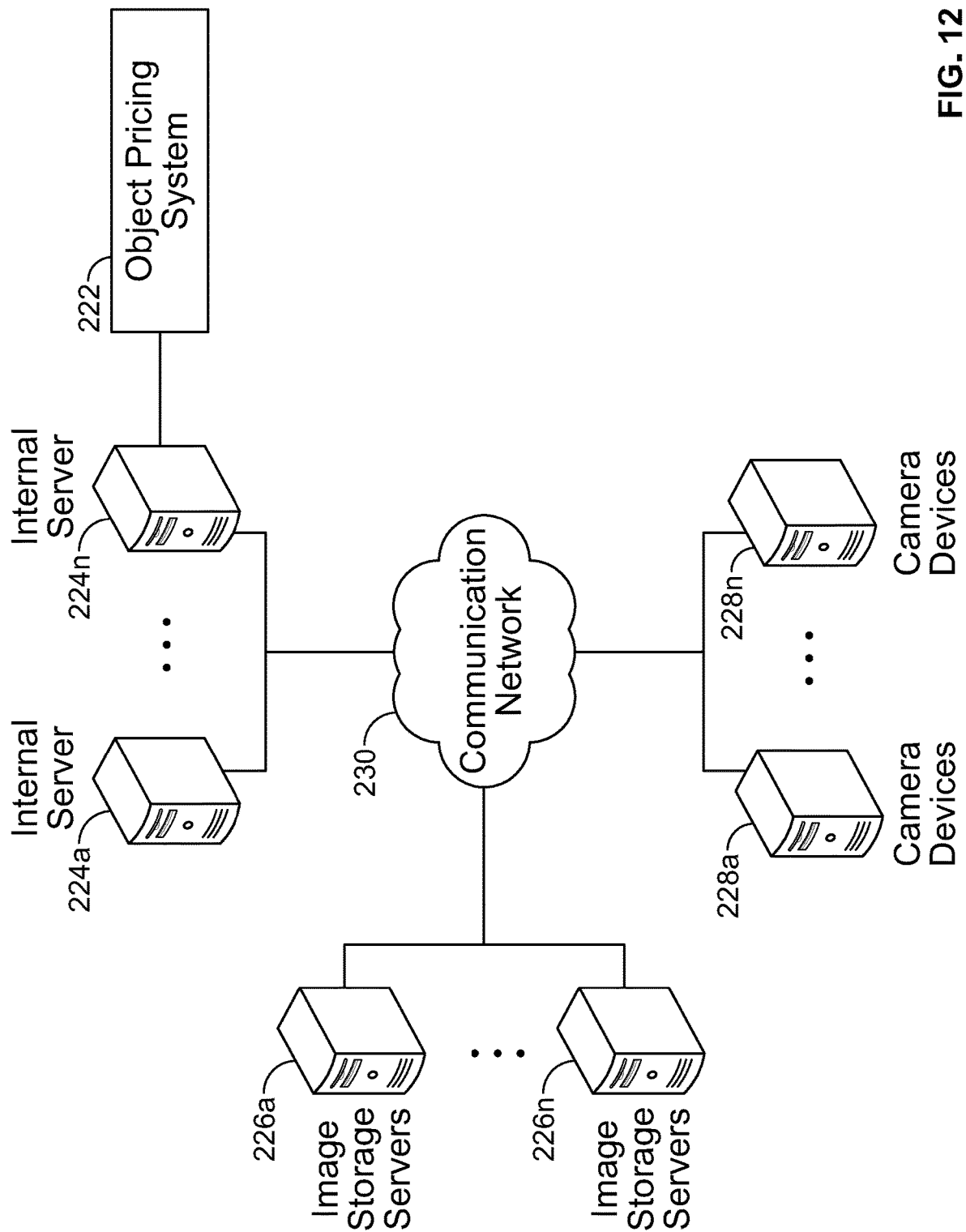
FIG. 12 is a diagram illustrating sample hardware components on which the system of the present disclosure could be implemented.

FIG. 12 is a diagram illustrating computer hardware and network components on which the system of the present disclosure could be implemented. The system can include a plurality of internal servers 224a-224n having at least one processor and memory for executing the computer instructions and methods described above (which could be embodied as computer software 222 illustrated in the diagram). The system can also include a plurality of image storage servers 226a-226n for receiving the image data and video data. The system can also include a plurality of camera devices 228a-228n for capturing image data and video data. These systems can communicate over a communication network 230. The object pricing system or engine can be stored on the internal servers 224a-224n or on an external server(s). Of course, the system of the present disclosure need not be implemented on multiple devices, and indeed, the system could be implemented on a single computer system (e.g., a personal computer, server, mobile computer, smart phone, etc.) without departing from the spirit or scope of the present disclosure.

Figure 13:
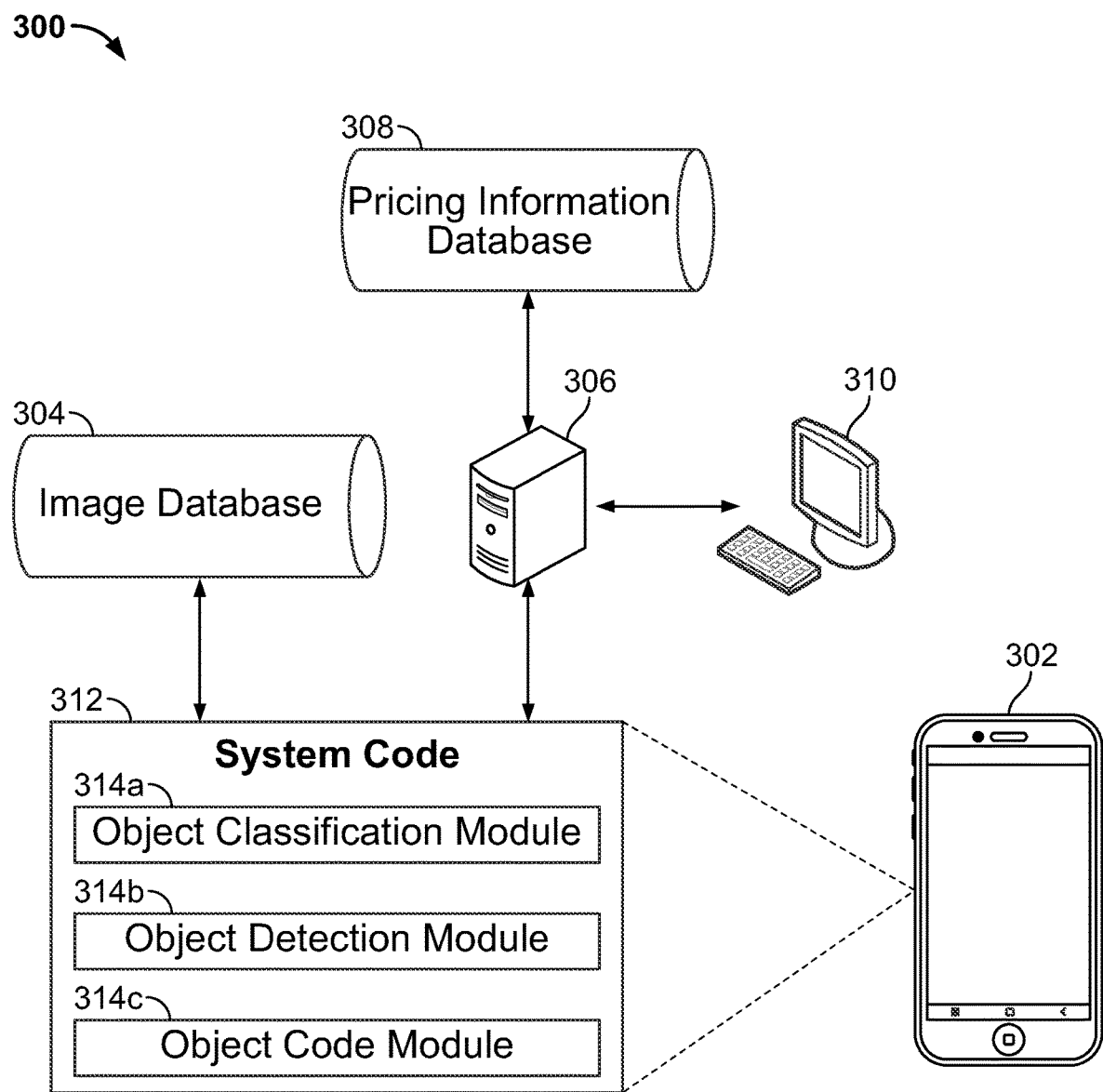
FIG. 13 is a diagram illustrating another embodiment of the system of the present disclosure.

FIG. 13 is a diagram illustrating another embodiment of the system of the present disclosure. The system 300 could be embodied as a mobile terminal 302 (processor) in communication with an image database 304, a server 306 in communication with a pricing information database 308, and, optionally, a remote computer 310. The mobile terminal 302 could include, but is not limited to, a smart phone, a tablet, a cloud computing device or any other suitable device programmed to carry out the processes disclosed herein. The system 300 could classify an object present in a scene viewed by the mobile terminal 302, capture and store an image of the classified object in the image database 304, and assign the classified object a price obtained from the pricing information database 308 via the server 306 and based on a user input from the remote computer 310.

The image database 304 could include digital images, digital image datasets comprising images of objects, videos, image embeddings, and/or associated labels, if desired. Further, the datasets could include, but are not limited to, images of objects commonly found in residential and commercial buildings. The mobile terminal 302 executes system code 312 or invokes an API that executes the system code to classify an object present in a scene viewed by the mobile terminal 302, adds the classified object to an inventory, generates a set of fine-grained object codes related to the classified object, and assigns at least one object code to the classified object based on user input and/or automatically (e.g., without requiring user input).

Figure 14A:
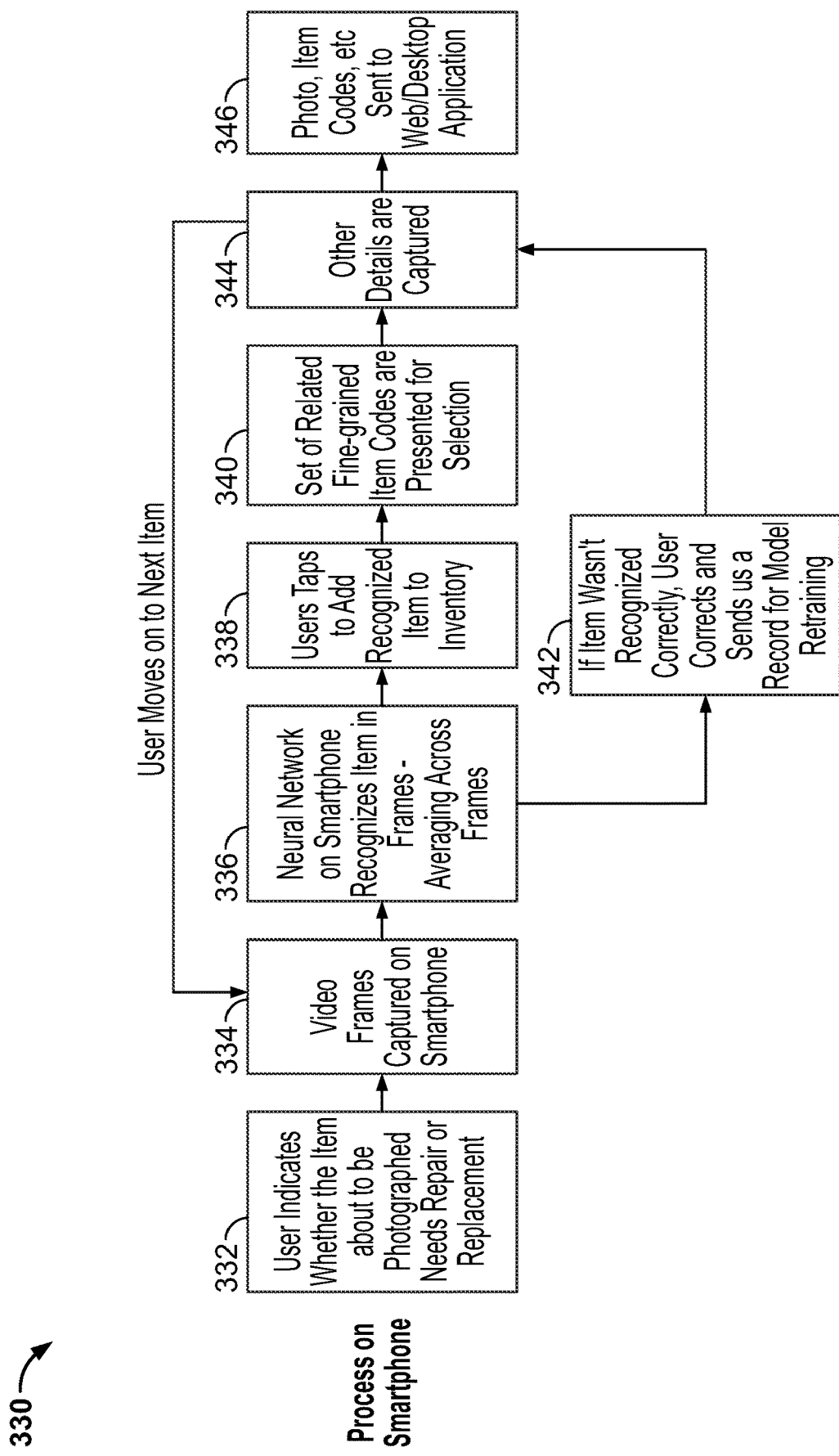
FIG. 14A is a flowchart illustrating processing steps for object classification carried out by the system of the present disclosure.
Figure 18:
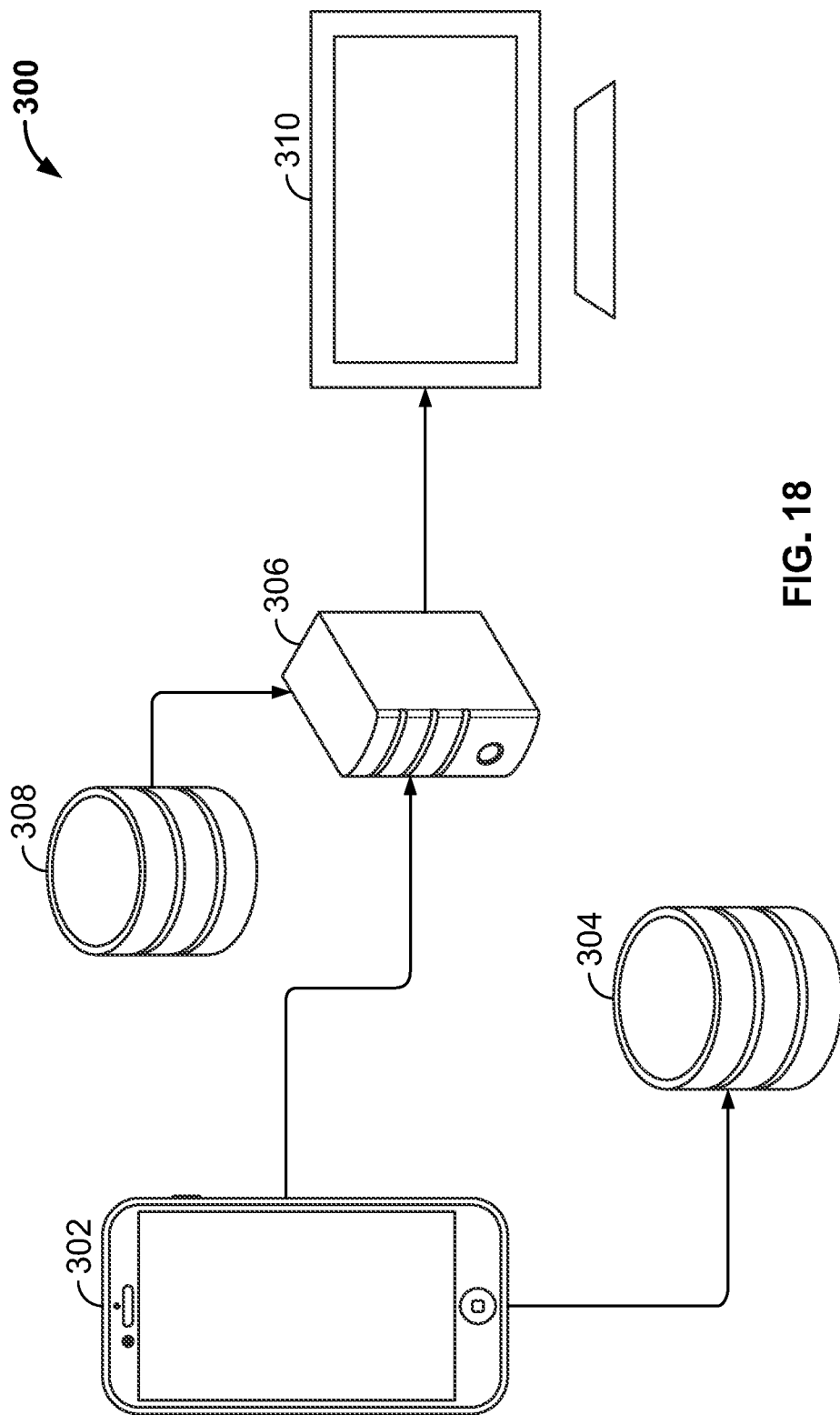
FIG. 18 is diagram illustrating a high level configuration of the system of FIG. 13.

The system 300 includes system code 312 (non-transitory, computer-readable instructions) stored on a computer-readable medium and executable by the mobile terminal 302 or one or more computer systems. The code 312 could include various custom-written software modules that carry out the steps/processes discussed herein, and could include, but is not limited to, an image classification module 314a, an object detection module 314b, and an object code module 314c. The code 312 could be programmed using any suitable programming languages including, but not limited to, C, C++, C#, Java, Python or any other suitable language, as well as one or more suitable machine learning frameworks including, but not limited to, Tensorflow, PyTorch, Keras, Caffe, MXNet, etc. Additionally, the code 312 could be distributed across multiple computer systems in communication with each other over a communications network, and/or stored and executed on a cloud computing platform and remotely accessed by a computer system in communication with the cloud platform. The code 312 could communicate with the image database 304, which could be stored on the same computer system as the code 312, or on one or more other computer systems in communication with the code 312, and the server 306. Still further, the system 300 could be embodied as a customized hardware component such as a field-programmable gate array ("FPGA"), application-specific integrated circuit ("ASIC"), embedded system, or other customized hardware components without departing from the spirit or scope of the present disclosure. It should be understood that FIG. 13 is only one potential configuration, and the system 300 of the present disclosure can be implemented using a number of different configurations. For example and as described below, FIG. 18 illustrates another configuration of the system 300. FIG. 14A is a flowchart 330 illustrating processing steps for object classification carried out by the system 300 of the present disclosure via a local software application executing on the mobile terminal 302. Beginning in step 332, a user indicates whether an object (e.g., a household object) present in the field of view of a camera of the mobile terminal 302 requires repair, replacement or storage. In step 334, the system 300 captures a plurality of video frames via the camera of the mobile terminal 302. Then, in step 336, the system 300 processes the video frames via a neural network to classify (e.g., recognize) the object present therein by averaging across the video frames. If the system 300 recognizes the object present in the video frames, then the process proceeds to step 338, wherein the user selects the recognized object to add the recognized object to an inventory. It should be understood that the recognized object can also be added to the image database 304. In step 340, the system 300 generates and presents the user with a set of related fine-grained (detailed) item codes based on the recognized object from which the user can select at least one item code. The process then proceeds to step 344. Alternatively, if the system 300 does not recognize or incorrectly recognizes the object present in the video frame, then the process proceeds to step 342. In step 342, the user manually classifies the object. It should be understood that the system 300 can generate a record of the incorrectly recognized object to retrain the neural network. In step 344, the system 300 allows the user to capture other details associated with the recognized object, if desired. If the user wishes to view another object, then the process returns to step 334. Alternatively, if the user does not wish to view another object, then the process proceeds to step 344. Then, in step 346, the inventory including the captured video frames, at least one item code, and, optionally, other details associated with the recognized object is transmitted to the server 306 where the inventory is accessible via a computer (e.g., a desktop) or a web software application executing on a central processing unit 310 of the system 300.

Figure 14B:
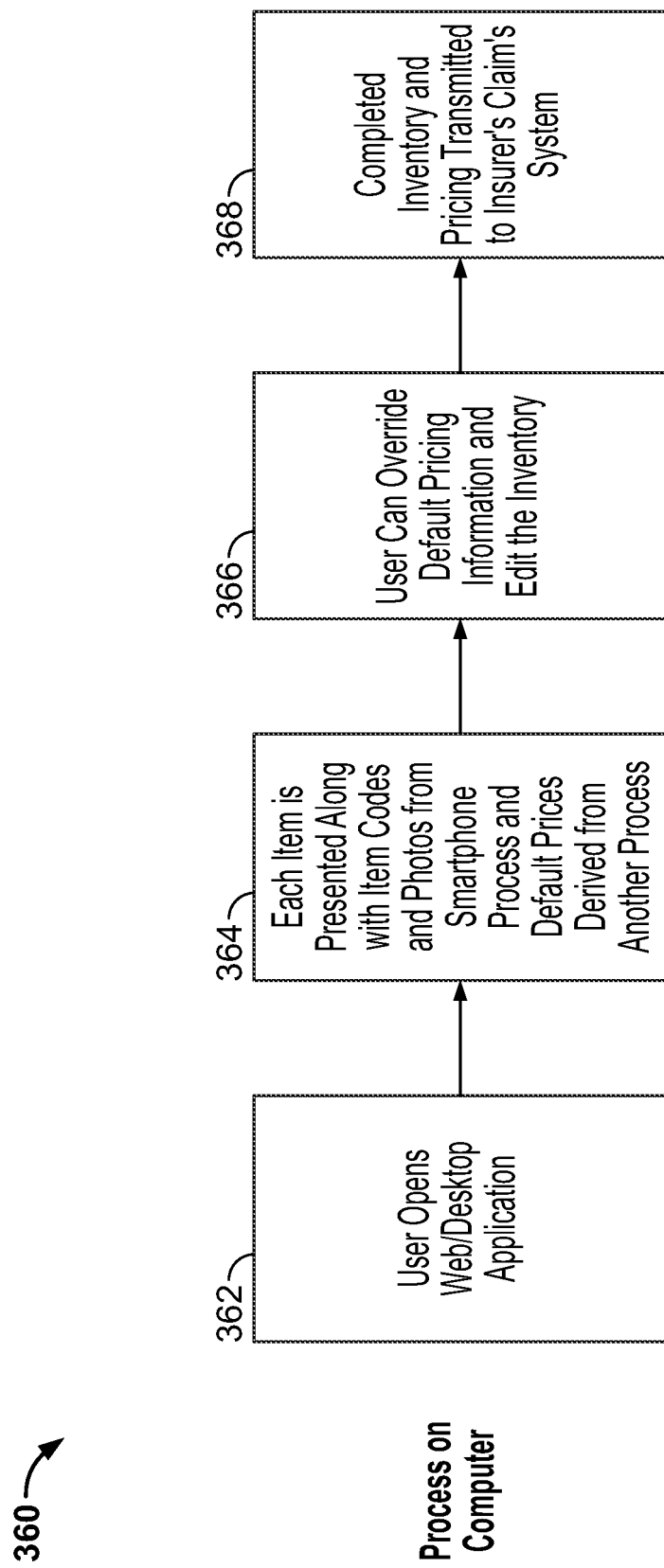
FIG. 14B is a flowchart illustrating processing steps for object pricing carried out by the system of the present disclosure.

FIG. 14B is a flowchart 360 illustrating processing steps for object pricing carried out by the system 300 of the present disclosure via a personal computer (e.g., a desktop) or a web software application executing on the remote computer 310. In step 362, a user opens the desktop or web software application executing on the remote computer 310. Then, in step 364, the system 300 presents the user with an inventory including each recognized object and associated items codes, video image frames, and predetermined price information. It should be understood that the predetermined price information of each recognized object can be derived from a third party process. In step 366, the user can edit the inventory including modifying the predetermined price information of each recognized object. Then, in step 368, the completed inventory is transmitted to a third party system (e.g., an insurer's claim system).

Figure 15:
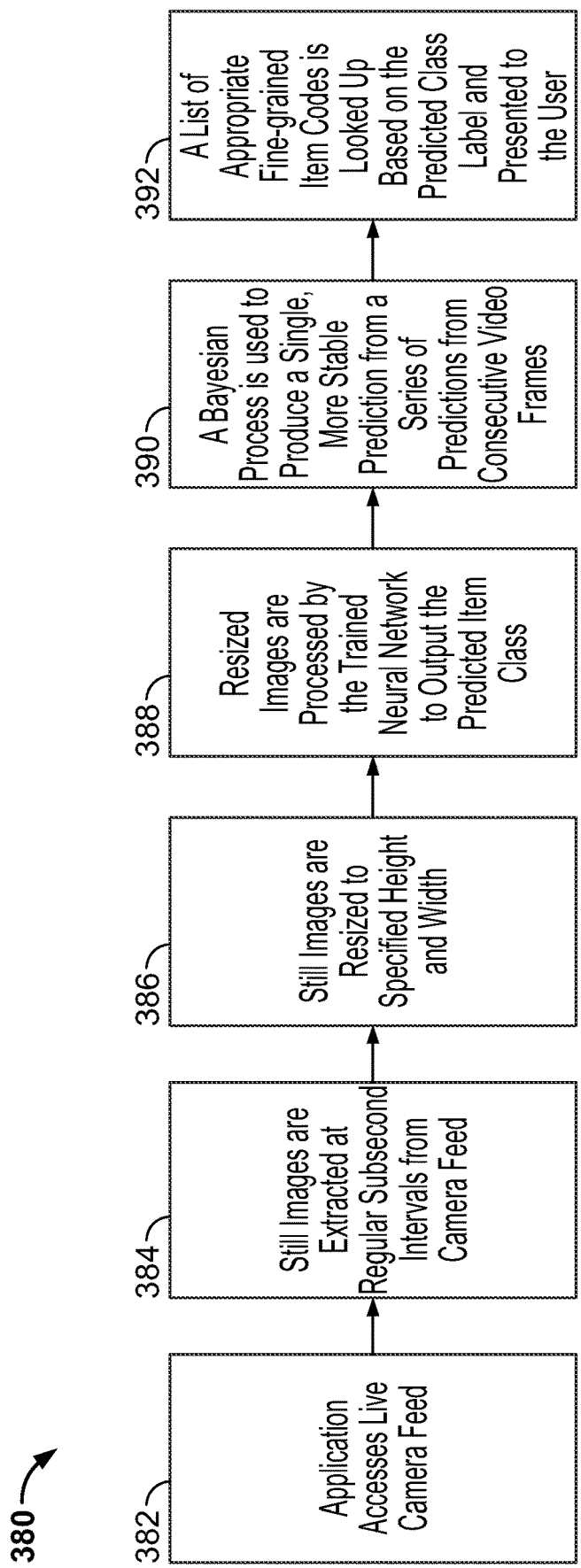
FIG. 15 is a flowchart illustrating, in greater detail, processing steps carried out on a mobile device in accordance with the system of the present disclosure.

FIG. 15 is a flowchart 380 illustrating additional processing steps for object classification carried out by the system 300 of the present disclosure. In step 382, the system 300 accesses, via the local software application executing on the mobile terminal 302, a live feed of a camera of the mobile terminal 302. In step 384, the system 300 extracts video image frames (e.g., still images) at regular sub-second intervals from the camera feed. Then, in step 386, the system 300 resizes the extracted still images to a specified height and width.

In step 388, the system 300 processes the resized still images using a neural network to output a predicted object class associated with an object present in the still images. In particular, the neural network is trained to output a predicted object class indicative of an item, including residential and/or commercial items. The neural network can be a convolutional neural network (CNN). Each predicted object class corresponds to pricing information of the pricing information database 308 via groupings of item codes indicative of different variations of each possible residential item type. This mapping between still images and pricing information is made possible by predefining relationships between items recognized by the neural network and pre-defined object codes for which pricing data is collected and/or by using a neural network to compare item images and video frames with the image datasets of the image database 304.

Figure 16:
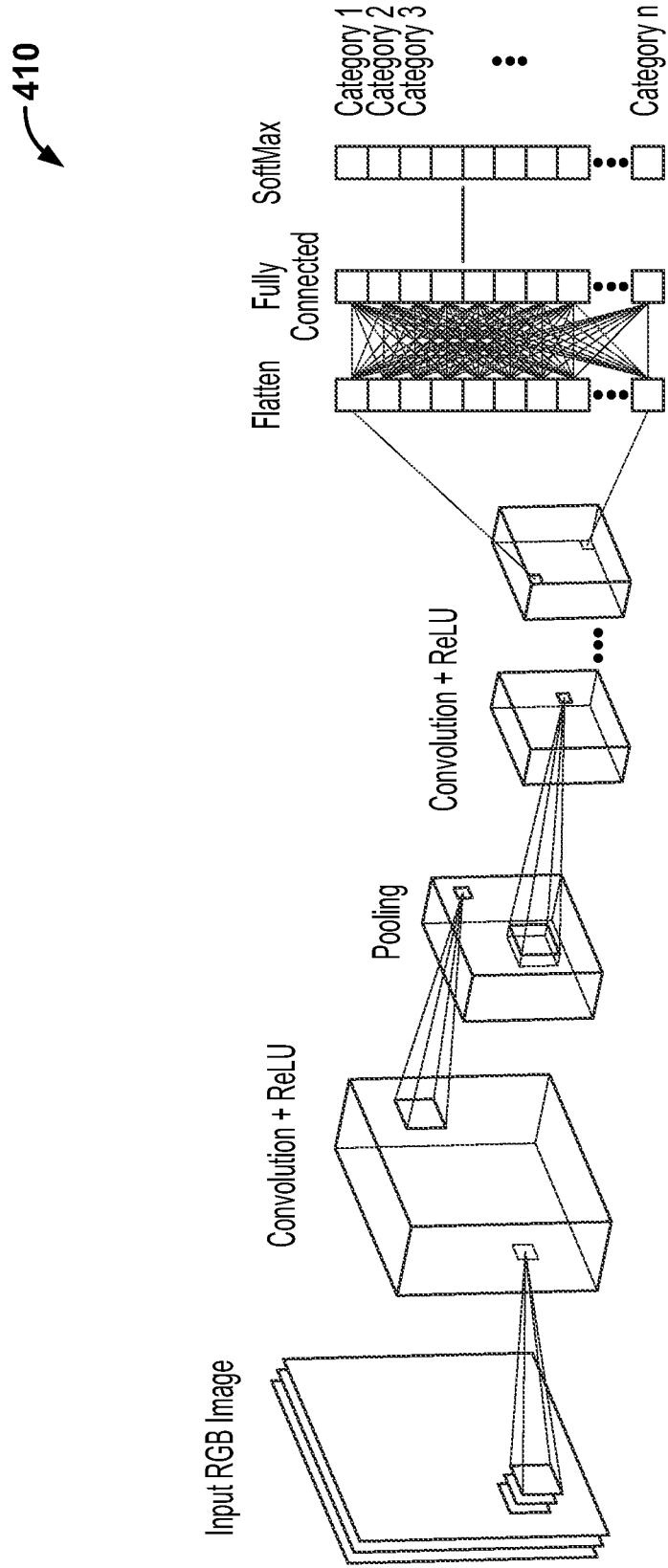
FIG. 16 is a diagram illustrating a neural network for classifying an object present in an image or video frame.

FIG. 16 is a diagram 410 illustrating a neural network for classifying an object present in an image. In particular, FIG. 16 illustrates a CNN and a flow for determining each convolutional feature within the CNN in two dimensions. It should be understood that the CNN can utilize convolution in many more dimensions and via several different layer types including, but not limited to, a fully connected (FC) layer, a pooling layer, a convolutional layer, a depth wise separable layer and a residual block. Suitable deep learning modes that can be utilized with the object classification process include, but are not limited to, MobileNet, EfficientNet and SqueezeNet.

Returning to FIG. 15, in step 390, the system 300 could utilize a Bayesian process to generate an individual and stable object class prediction from a series of object class predictions from consecutive video frames. Lastly, in step 392, the system 300 looks up a list of fine-grained items codes based on the generated individual and stable object class prediction and presents the fine-grained items codes to the user for selection.

Figure 17:
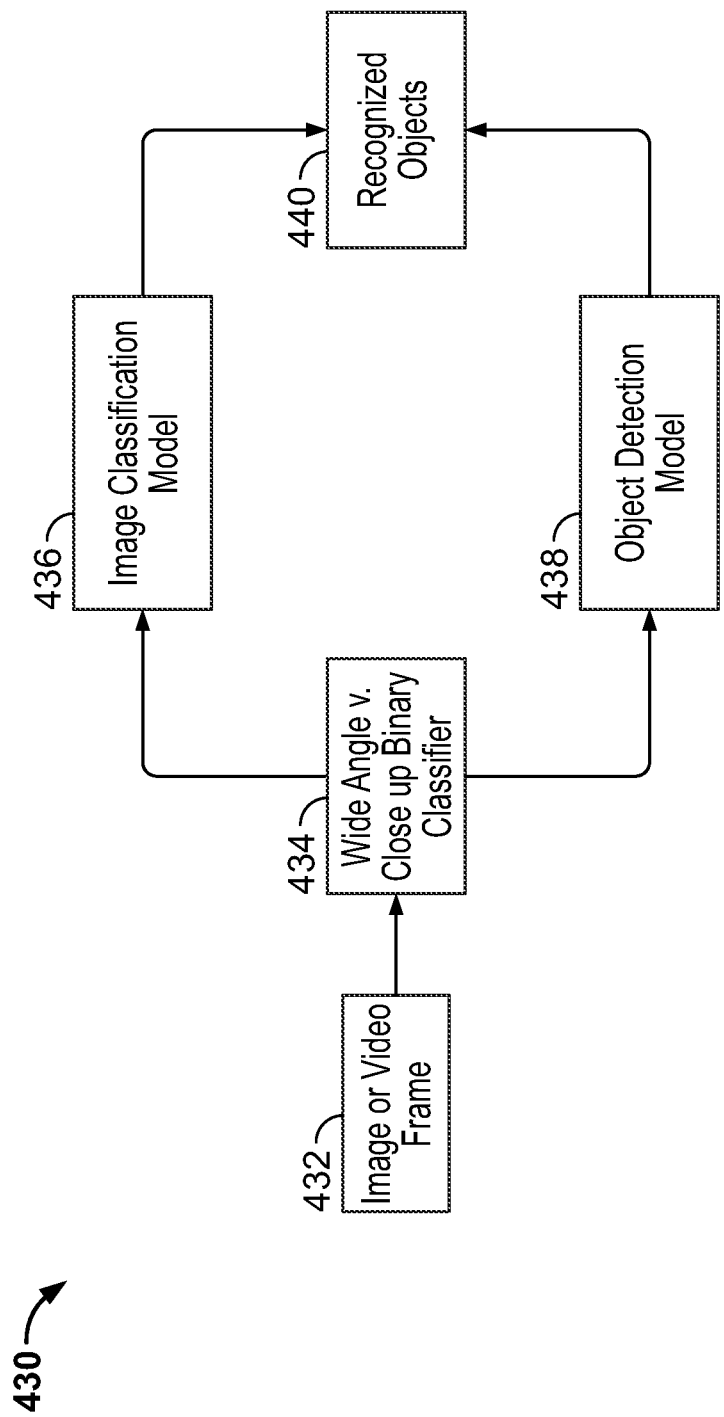
FIG. 17 is a flowchart illustrating processing steps carried out by the system of the present disclosure for recognizing individual objects present in an image or video frame or multiple objects based on the type of scene imaged.

FIG. 17 is a flowchart 430 illustrating processing steps carried out by the system 300 of the present disclosure for recognizing an object present in an image or video frame based on whether the photo or video frame is a close-up of an item or a wide-angle shot of a room. In step 432, the system 300 obtains an image or video frame via a camera of the mobile terminal 302. In step 434, the system 300 processes the image or video frame using a binary classifier (e.g., a CNN) to determine whether the image or video frame is a wide angle or close up image or video frame. If the image or video frame is a close up image or video frame, then the process proceeds to step 436. In step 436, the system 300 classifies an object present in the close up image or video frame via object classification processing steps as described above in relation to FIGS. 14A and 15. The process then proceeds to step 440. Alternatively, if the image or video frame is a wide angle image or video frame, then the process proceeds to step 438. In step 438, the system 300 detects an object present in the wide angle image or video frame via object detection processing steps as described above in relation to FIGS. 3-6. The process then proceeds to step 440. In step 440, the system 300 recognizes the object present in the wide angle or close up image or video frame.

FIG. 18 is diagram illustrating a high level configuration of the system 300 of FIG. 13. As described above, the system 300 classifies, via a local software application executing on a mobile terminal 302, an object present in a scene viewed by a camera of the mobile terminal 302 (e.g., a video frame). The system 300 can add the classified video frame image to an image database 304. In addition, the system 300 adds the classified object to an inventory including, but not limited to, a video frame image, at least one object code and, optionally, other details associated with the classified object. The inventory is transmitted to a server 306.

The server 306 processes the inventory and assigns predetermined pricing information to the classified object. The inventory is accessible by a user (e.g., an insurance professional) from a remote computer 310 (e.g., a desktop computer) via a desktop or a web software application executing on the computer 310. It should be understood that the desktop or web software application can be hosted by the server 306. The insurance professional can edit the inventory including modifying the predetermined price information of the classified object based on pricing information obtained from the pricing information database 308.

Figure 19:
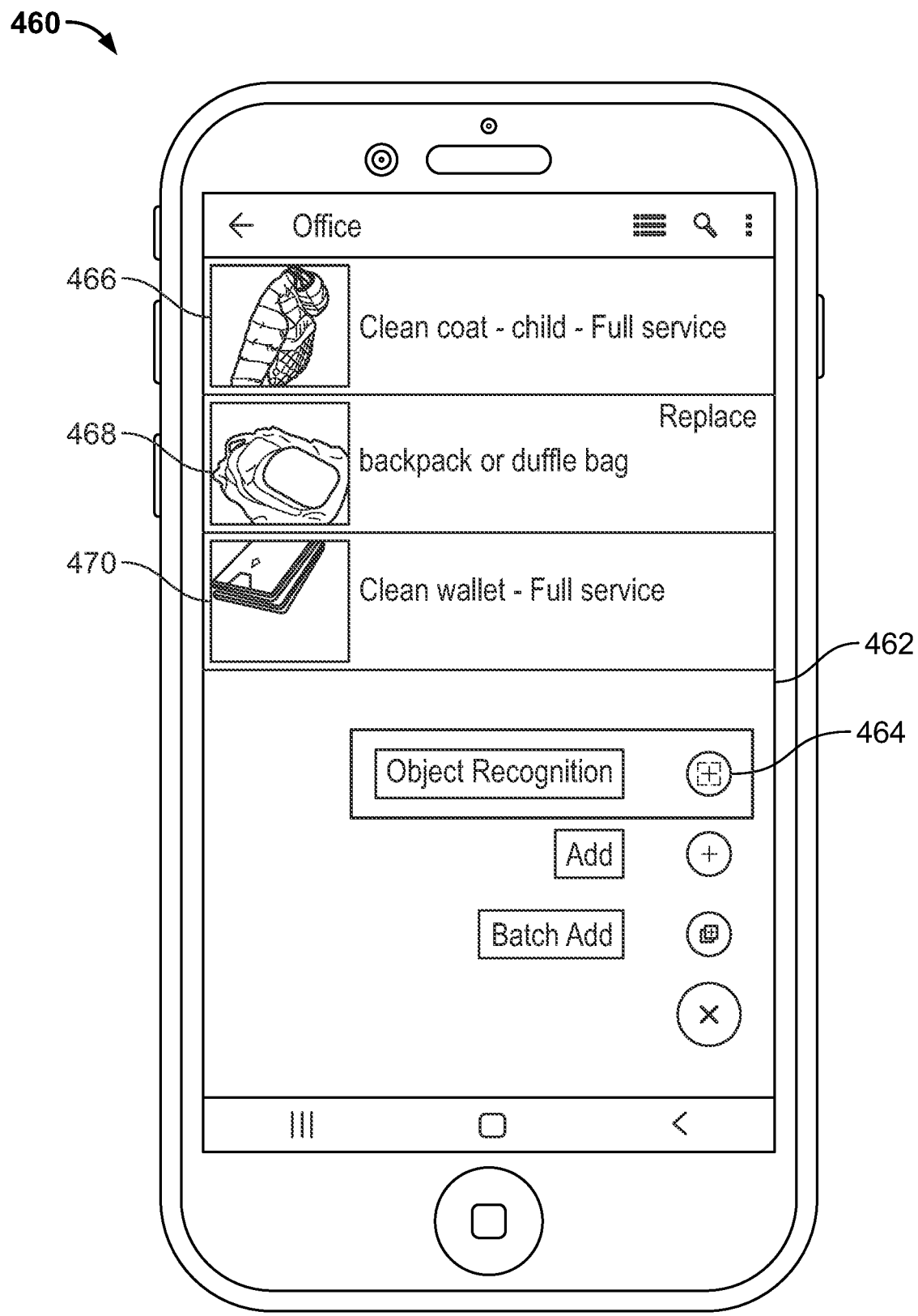
FIG. 19 is a screenshot illustrating a graphical user interface screen of a locally-executing software application of the system of the present disclosure.

FIG. 19 is a screenshot 460 illustrating a graphical user interface screen of a locally-executing software application of the system 300 of the present disclosure. In particular, FIG. 19 illustrates a graphical user interface screen displaying a selection menu 462 which allows a user to perform object recognition by selecting an object recognition button 464. As shown in FIG. 19, utilizing object recognition allows a user to indicate whether a recognized object such as a coat 466, a backpack or duffle bag 468 or a wallet 470 requires cleaning or replacement.

Figure 20:
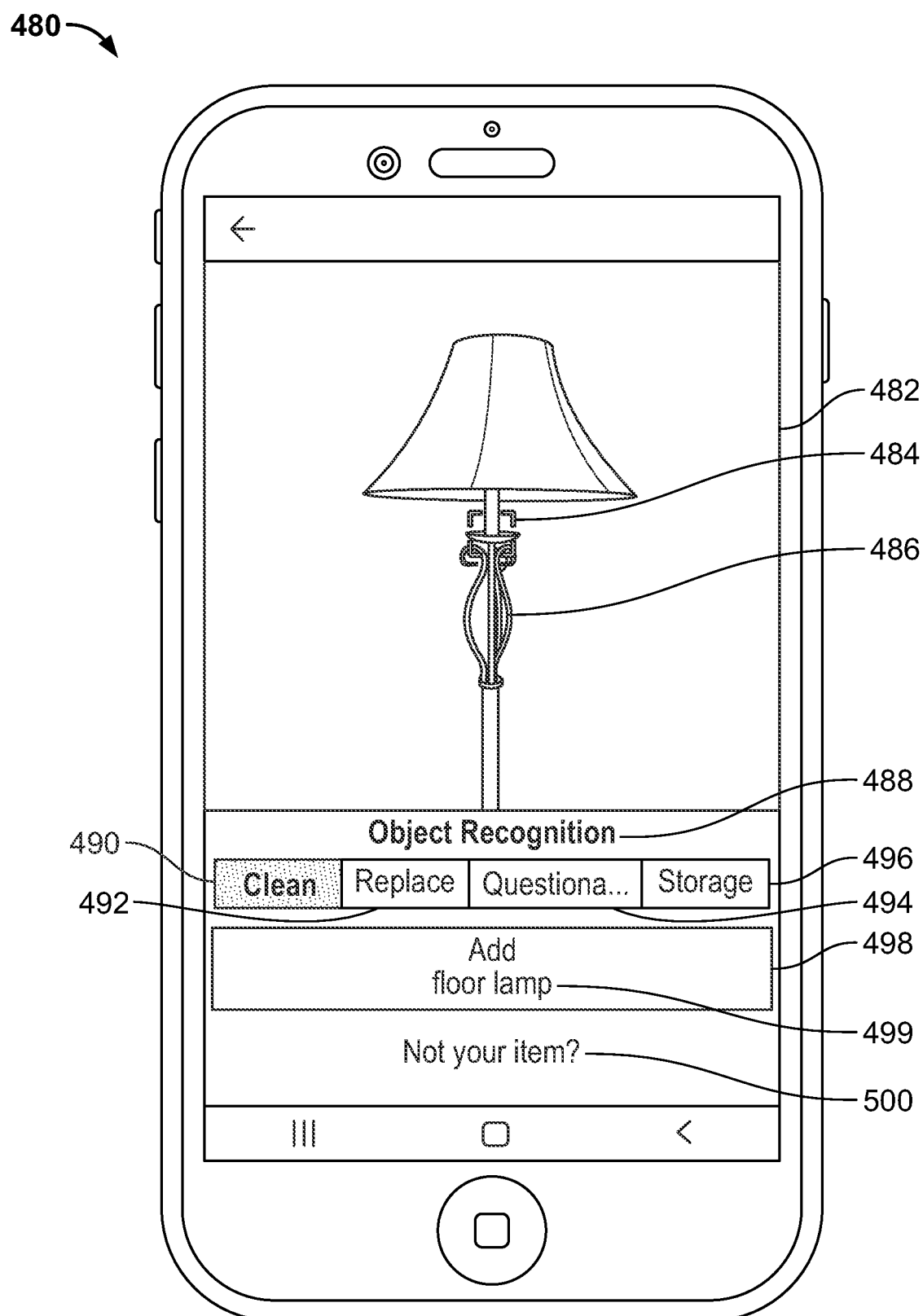
FIGS. 20-23 are screenshots illustrating tasks executed by the locally-executing software application of FIG. 19.

FIGS. 20-23 are screenshots illustrating tasks executed by the locally-executing software application of FIG. 19. FIG. 20 is a screenshot 480 of the graphical user interface screen displaying a camera view 482 including a reticle 484 positioned on an object 486 (e.g., a floor lamp) to be classified. In addition, the graphical user interface screen displays an object recognition menu 488 including a series of action buttons such as clean button 490, replace button 492, questionable button 494, and storage button 496. Further buttons can then be used, such as add button 498 to add an item with its associated action, or to indicate that the machine learning model misclassified at item (using correction button 500). A user can select to clean the object 486 via the clean button 490, replace the object 486 via the replace button 492, indicate that there is doubt about what action (clean, replace, etc.) needs to be taken for object 486 via the questionable button 494, and/or store the object 486 via the storage button 496. Once the user has selected the action to be taken on the item 486, he or she can select to add the object 486 and associated action to an inventory via the add button 498 if the classification label 499 correctly displays the class of the object 486. If the classification label 499 doesn't correctly display the class of the item, the user can so indicate by pressing the correction button 500 which allows a user to manually correct the classification label 499 if the object 486 is incorrectly classified.

Figure 21:
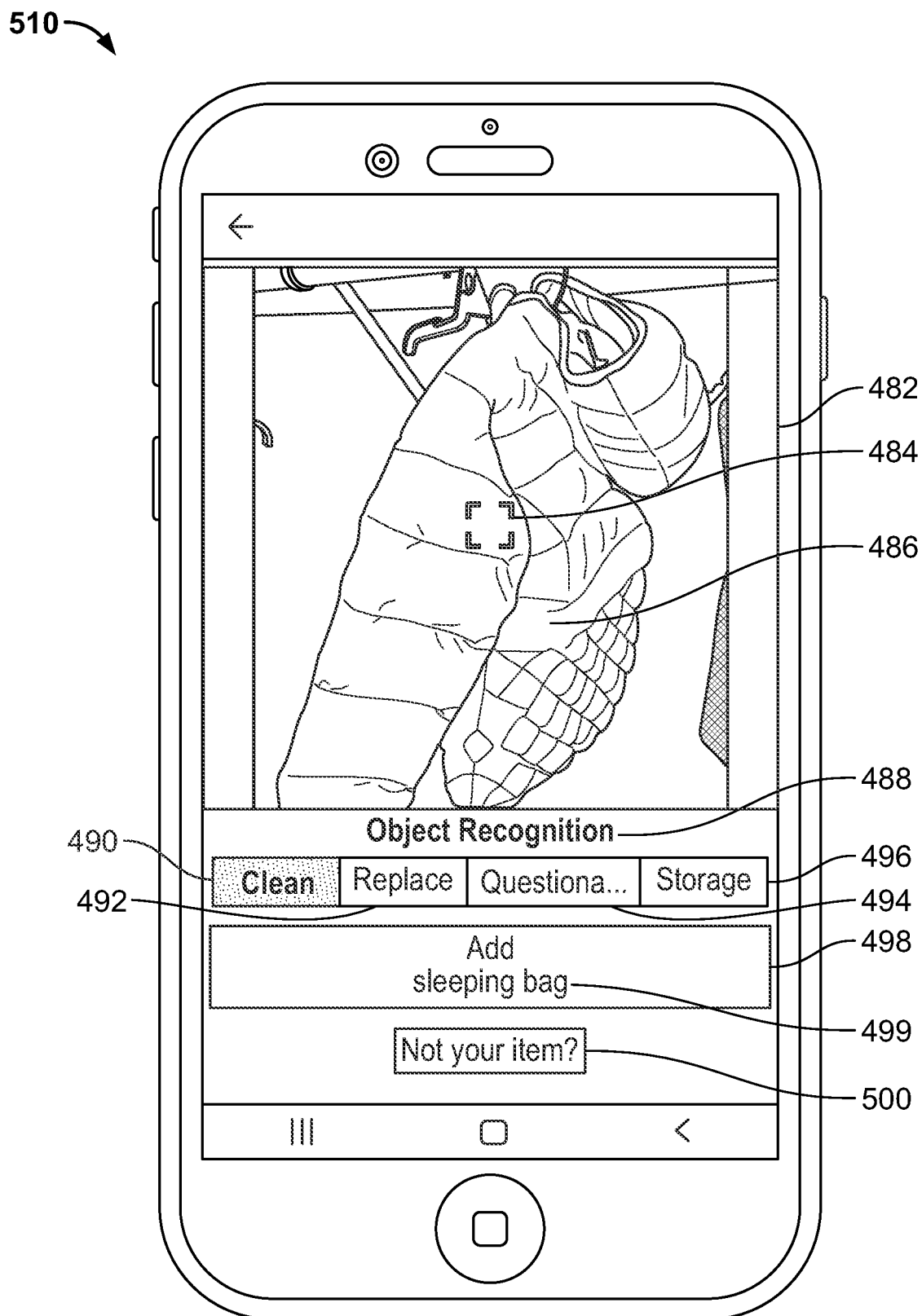
Figure 22:
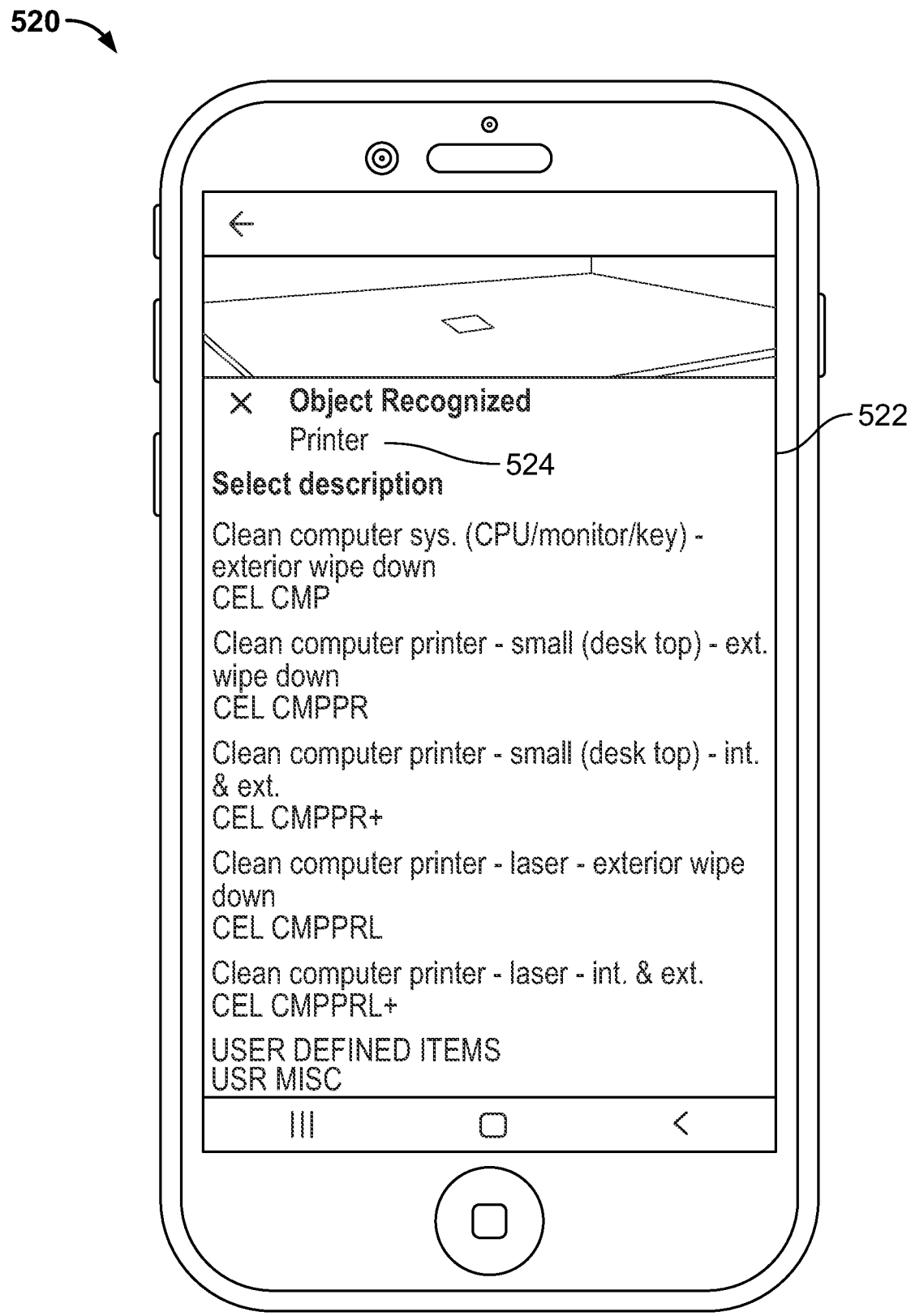
Figure 23:
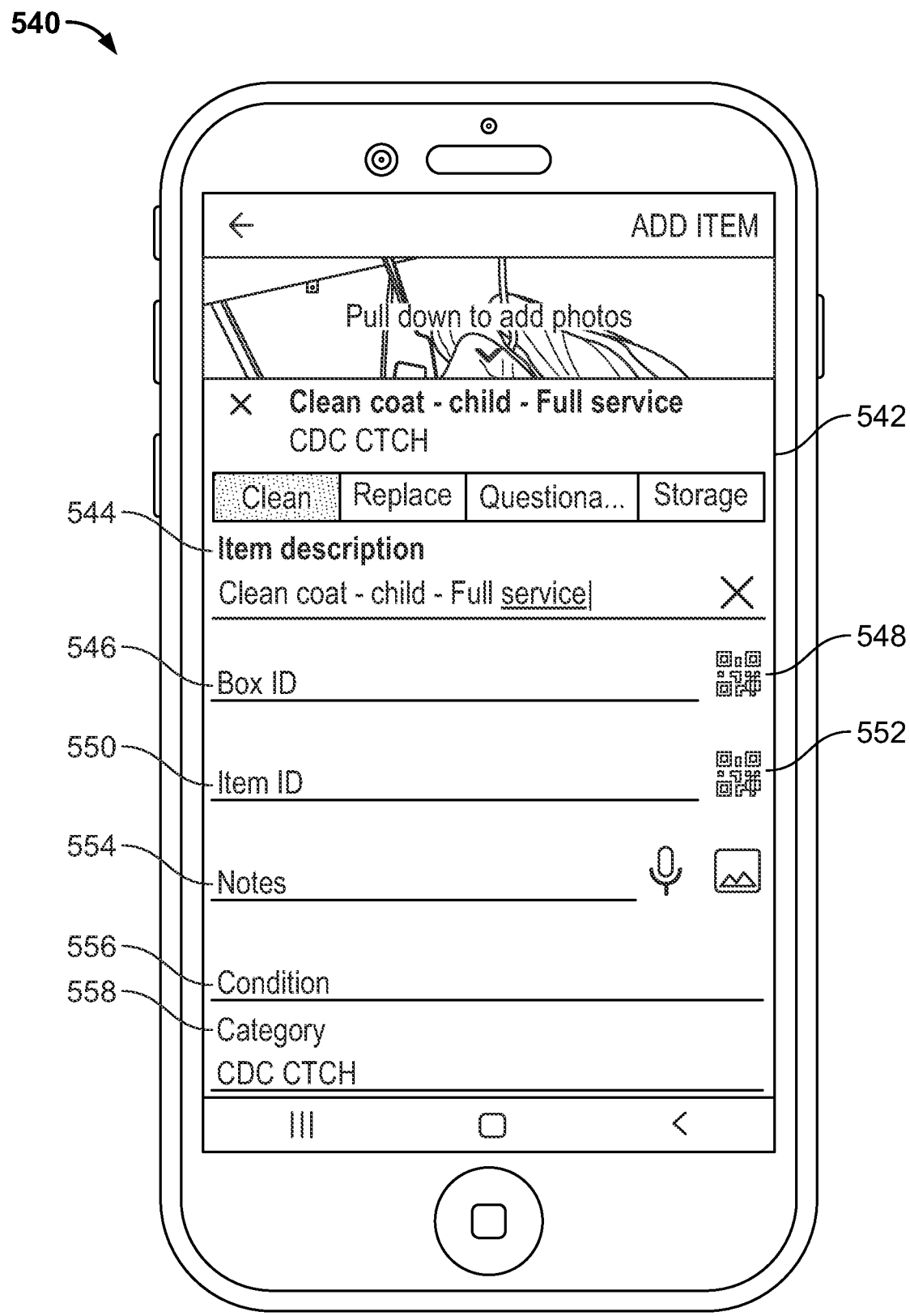

As shown in FIG. 20, the locally-executing software application classifies the object 486 as a "floor lamp" via the classification label 499 and the user selects the clean button 490 to clean the floor lamp. FIG. 21 is a screenshot 510 of the graphical user interface screen displaying a camera view 482 including a reticle 484 positioned on an another object 486 (e.g., a coat) to be classified. As shown in FIG. 21, the locally-executing software application incorrectly classifies the object 486 as a "sleeping bag" via the classification label 499 and the user selects the correction button 500 to manually correct the classification label 499. FIG. 22 is a screenshot 520 of the graphical user interface screen displaying a fine-grained item menu 522 for which pricing information is available for a classified object 524 (e.g., a printer) and a selected action (e.g., clean or replace). FIG. 23 is a screenshot 540 of the graphical user interface screen displaying a details menu 542 for associating additional details with a classified object. For example, a user can associate a description 544, a box identification number 546 and a corresponding Quick Response (QR) code 548, an item identification number 550 and a corresponding QR code 552, at least one note 554, a condition 556 and a category 558 with the classified object. It should be understood that the QR codes 548 and 552 allow for the classified object to be tracked during cleaning, repair or storage.

FIG. 24 is a screenshot 560 illustrating a graphical user interface screen of a desktop or a web software application executing on the remote computer 310 of the system 300 of the present disclosure. As described above, a user (e.g., an insurance professional) can access an inventory from the remote computer 310 (e.g., a desktop computer) via the desktop or a web software application executing on the central processing unit 310. In particular, the insurance professional can edit the inventory including modifying the predetermined price information of the classified object based on pricing information obtained from the pricing information database 308.

Figure 25:
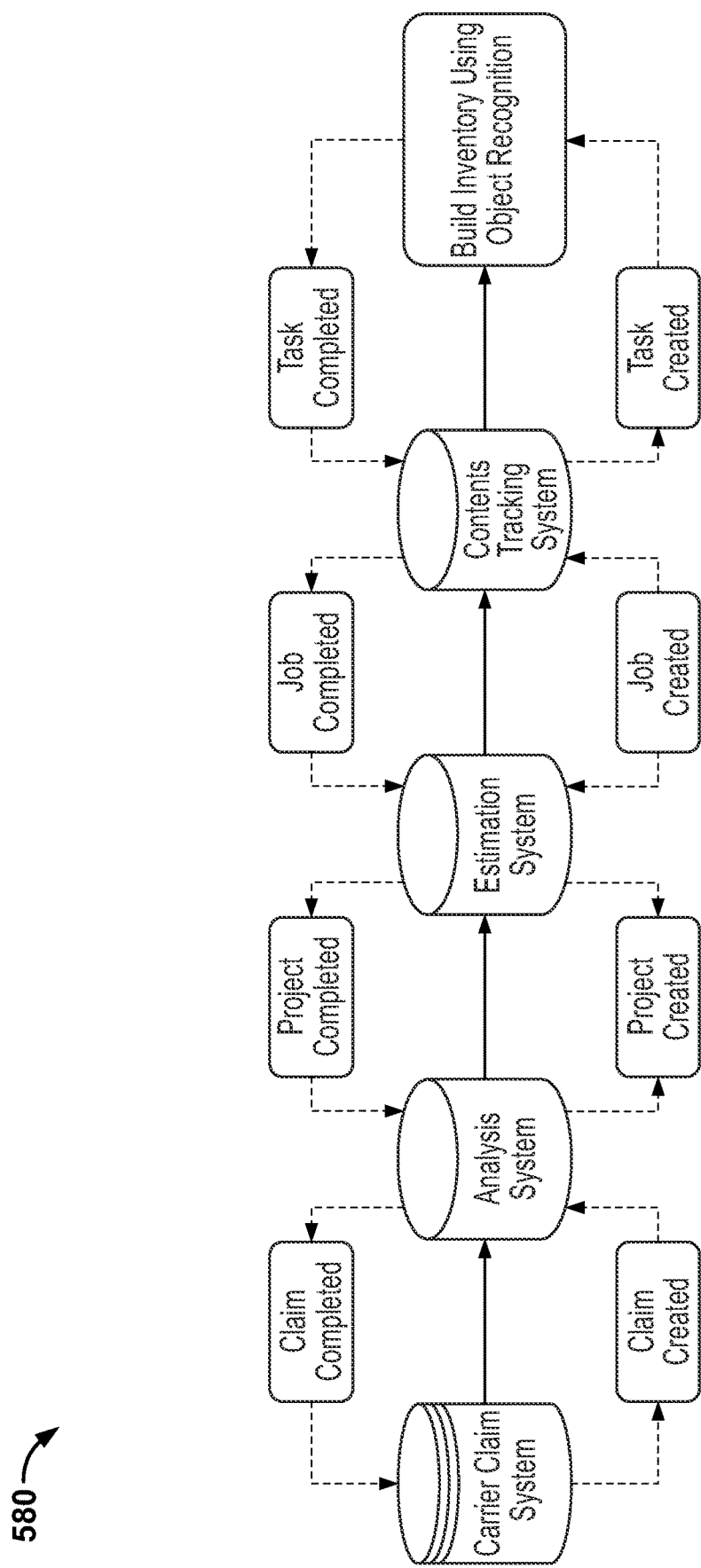
FIG. 25 is a diagram illustrating processing steps for generating an object inventory and transmitting the generated object inventory to a third party system.

FIG. 25 is a diagram 580 illustrating processing steps for generating an object inventory and transmitting the generated object inventory to a third party system (e.g., an insurance carrier's claim system). As shown in FIG. 25, multiple systems are utilized to execute processing steps to create and process a claim, project, job and task associated with generating an object inventory and transmitting the object inventory to the insurance carrier's claim system.

Figure 26:
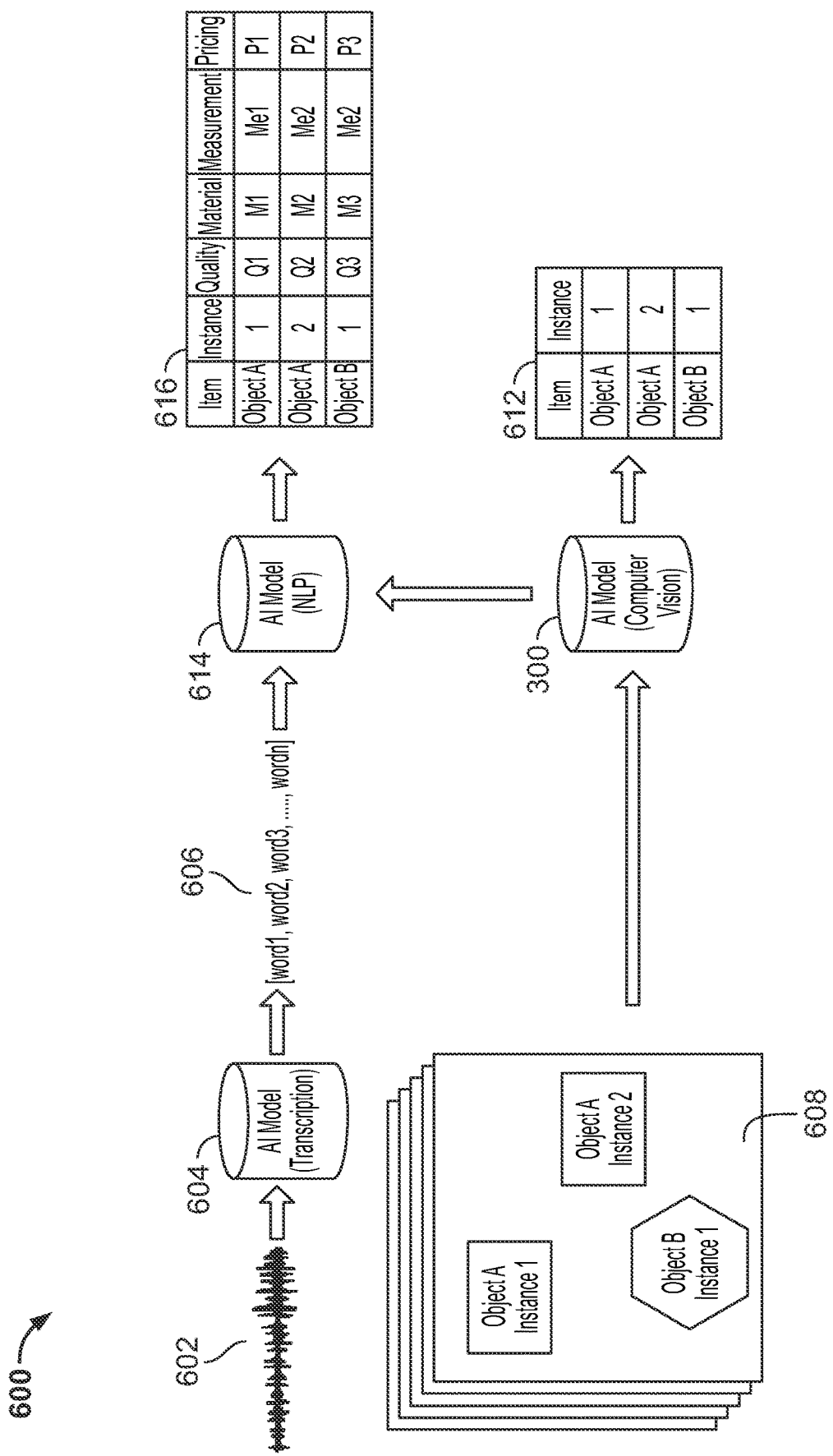
FIGS. 26-27 are diagrams illustrating system and/or technique processing steps that can be utilized in combination with the system of the present disclosure for identifying attributes of items and fine-grained item classification (FIG. 26) and tracking object through multiple video frames (FIG. 27)
Figure 27:
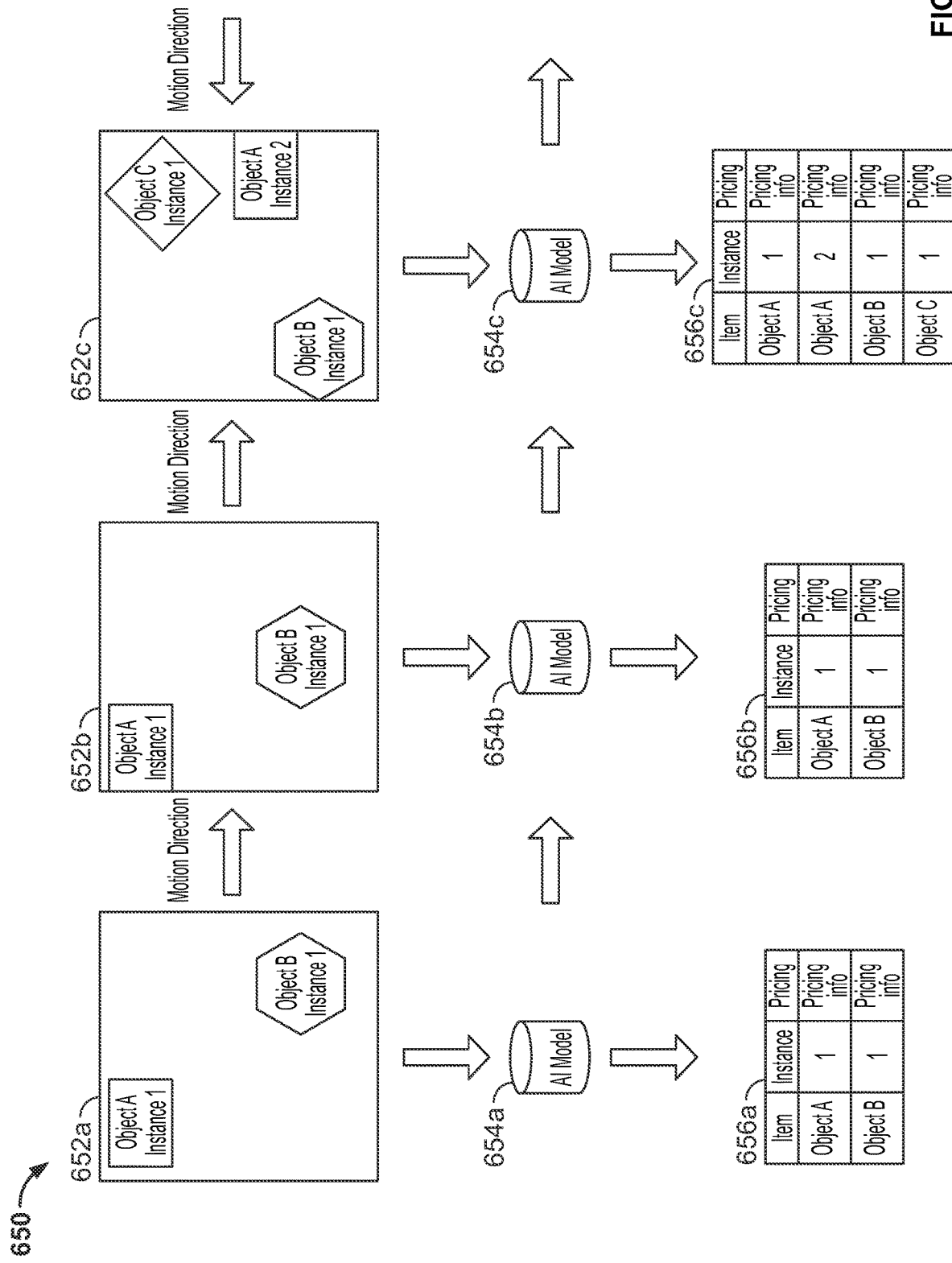
Figure 27:
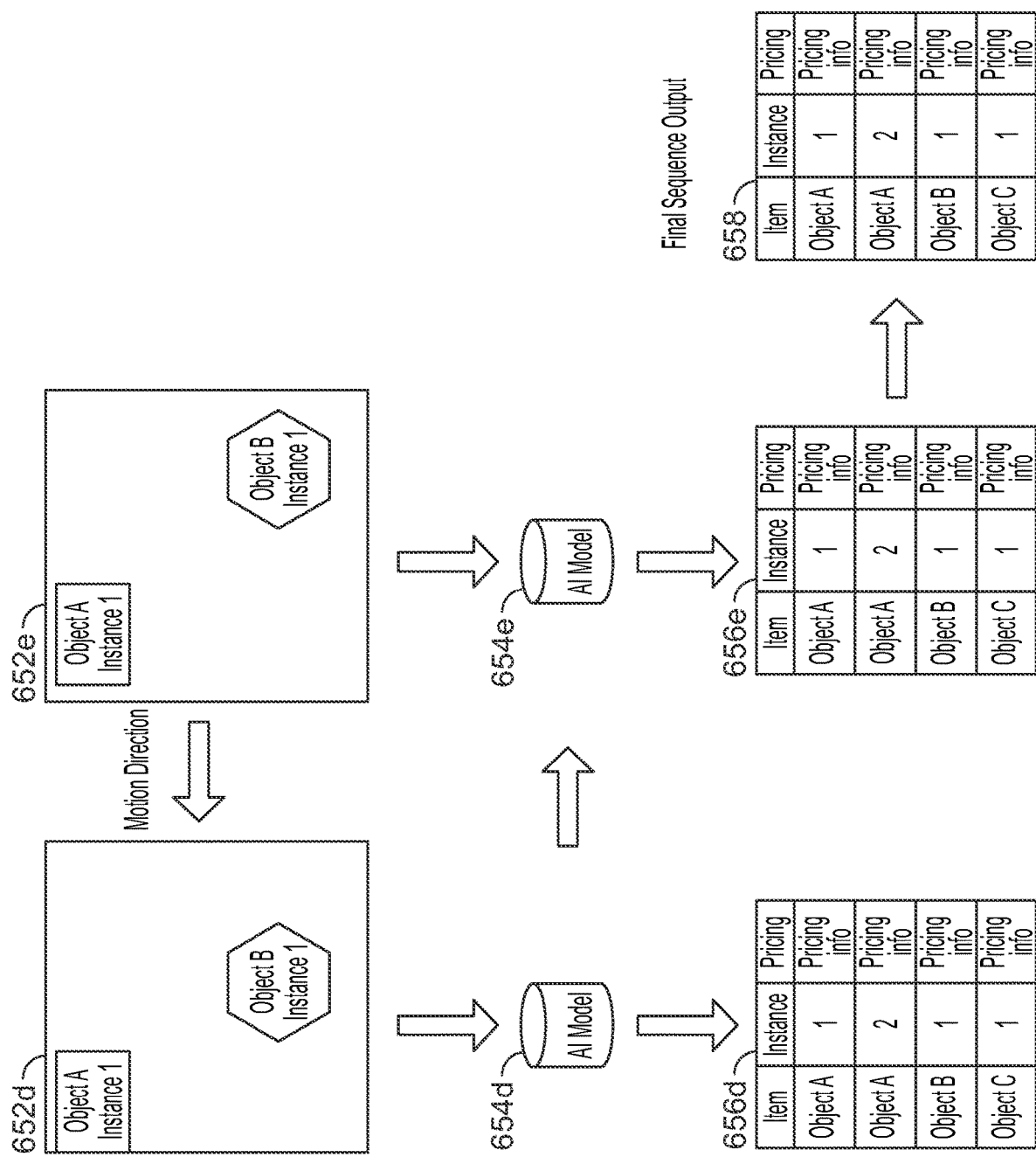

It should be understood that the system 300 can be utilized in combination with additional systems and/or techniques to perform object classification. FIGS. 26-27 are diagrams illustrating system and/or technique processing steps that can be utilized in combination with the system 300 to perform object classification. FIG. 26 is a diagram 600 illustrating audio data and image or video data processing steps for object classification. As shown in FIG. 26, audio data 602 is transcribed into a series of words 606 by a voice-to-text model 604. Additionally, the system 300 processes a plurality of image or video frames 608 having objects A, B, and C present therein. The system 300 generates an object information table 612 associating each object A, B and C with an instance value. A natural language processing (NLP) system 614 processes the transcribed text 606 in conjunction with the object information table 612 and generates an object information table 616 associating each object A, B and C and their respective instance values with descriptors (e.g., quality, material, measurement, pricing information, etc.) obtained from the audio data 602. It should be understood that the processing steps allow for finer grained item classification and can be utilized for object classification (e.g., single item detection) or object detection (e.g., multiple item detection).

FIG. 27 is a diagram 650 illustrating processing steps for tracking one or more objects moving through and/or appearing in and out of a series of image or video frames. In particular, FIG. 27 illustrates capabilities for tracking one or more objects as a mobile terminal 302 is moved around a space (e.g., a room) by a user such that the system 300 can prevent duplicative entries of the one or more objects to an inventory. The processing steps are executed by a combination of modelling techniques such as feature tracking, feature similarity, CNN+ long short-term memory (LSTM) models and CNN object detection including re-identification heads.

As shown in FIG. 27, objects present in respective image or video frames 652*a-e* are processed by corresponding artificial intelligence models 654*a-e* leveraging the aforementioned combination of modelling techniques to generate respective object information tables 656*a-e*. Each object information table 656*a-e* associates objects present in the respective image or video frames 652*a-e* with respective instance values and, optionally, descriptors (e.g., pricing information), and is generated in part based on the object information tables of preceding image or video frames.

For example, the object information table 656*a* is fed forward to the artificial intelligence model 654*b* and processed in conjunction with the objects present in the image or video frame 652*b* to generate the object information table 656*b*. Subsequently, the object information table 656*b* is fed forward to the artificial intelligence model 654*c* and processed in conjunction with the objects present in the image or video frame 652*c* to generate the object information table 656*c*. As such, the object information of preceding image or video frames (e.g., tables 656*a-d*) is fed forward and processed by the artificial intelligence models 654*b-e* to generate a final sequence object information table 658 that provides an itemized list of unique objects that may appear more than once in the image or video frames 652*a-e*. It should be understood that the processing steps can be utilized for object classification (e.g., single item detection) or object detection (e.g., multiple item detection).

Figure 28:
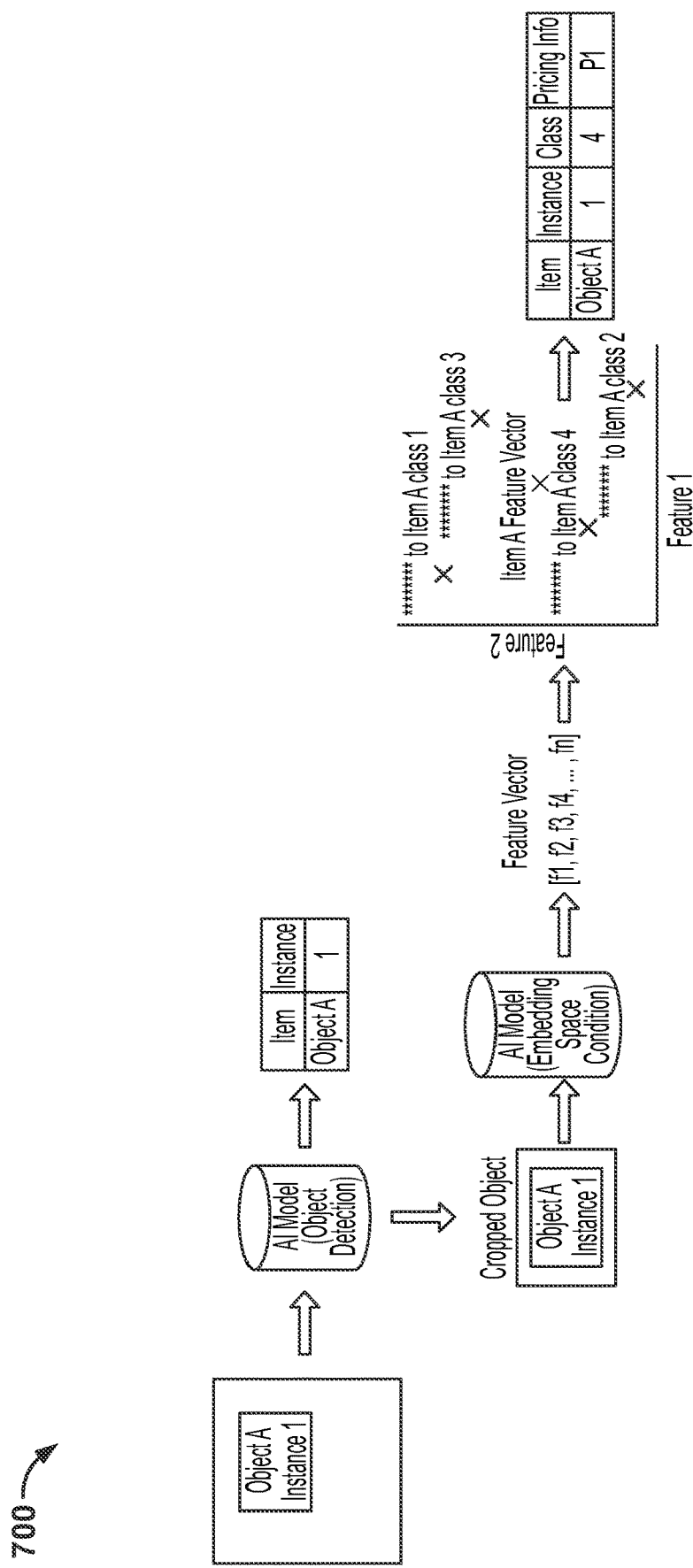
FIGS. 28-29 are diagrams illustrating processes for matching image or video frames with database images to facilitate classification, object feature identification, and object pricing.
Figure 29:
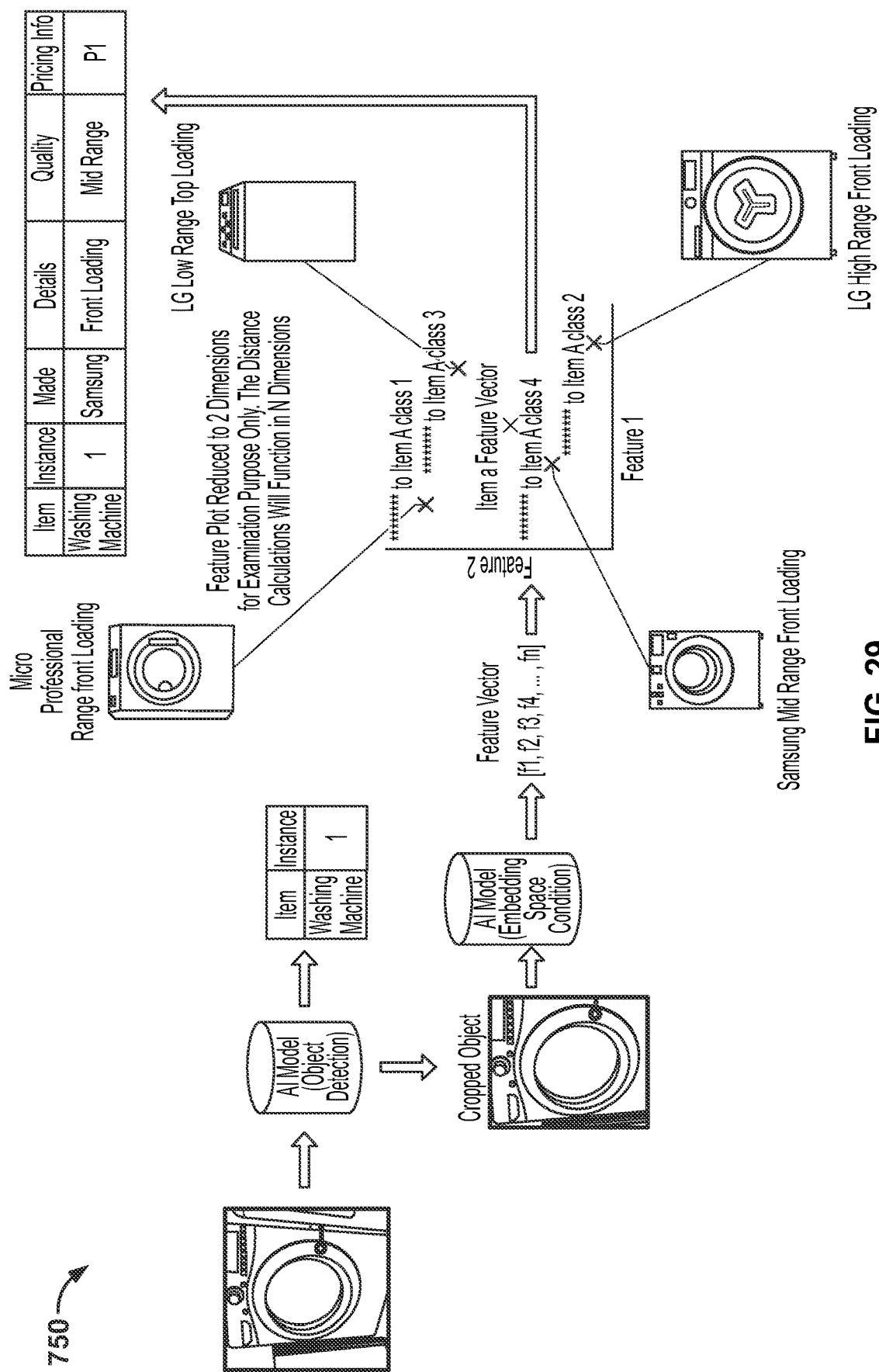

FIGS. 28 and 29 are diagrams illustrating processes for matching image or video frames with database images and video frames. FIG. 28 is a diagram 700 illustrating processing steps to map an embedding space of one set of images closer to another set of images utilizing a deep learning approach (e.g., fully connected layers with a loss function which minimizes and maximizes the distance between vectors within the feature space, such as a contrastive loss function). As shown in FIG. 28, the processing steps generate a feature plot that compares a feature vector for object A with centroids of previous feature vector clusters known to be object A and of distinct classes of object A. It should be understood that classes of an object can represent different qualities, materials, measurements or any other known descriptor for which feature vector cluster centroids have been calculated. It should also be understood that the processing steps can be utilized for object classification (e.g., single item detection) or object detection (e.g., multiple item detection).

FIG. 29 is a diagram 750 illustrating the processing steps of FIG. 28 in greater detail. In particular, diagram 750 illustrates a process for utilizing distance-based feature space calculation to obtain a fine-grained object classification. As shown in FIG. 29, a detected object (e.g., a washing machine) is cropped and parsed through a convolutional neural network trained to create a meaningful embedding for like objects. The training of this object can be performed with few samples utilizing a loss function which maximizes or minimizes distance within the feature space based on input pairings. This process allows for the feature space matching of both user-taken imagery with like imagery and also with stock photos for which the associated fine-grained details are known. It should be understood that fine grained details can refer to any descriptor of the object including, but not limited to, make, model, and dimensions.

Figure 30:
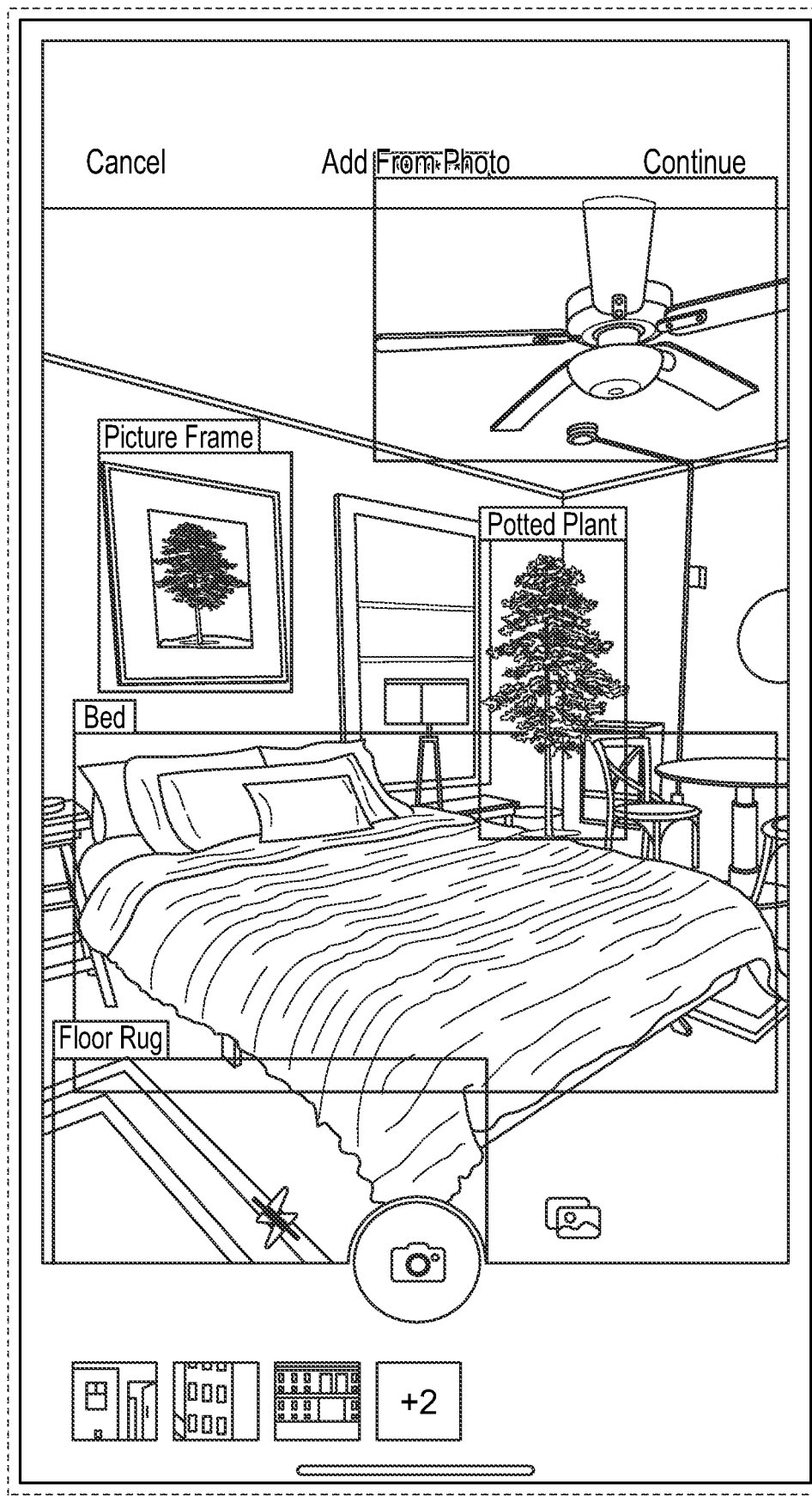
FIG. 30 is a screenshot illustrating detection by the system of multiple objects and associated bounding boxes generated by the system.

FIG. 30 is a screenshot illustrating multiple object detection carried out by the system (e.g., executing on a mobile terminal). As can be seen, the system allows for detection of multiple objects in the camera's field of view. Additionally, the system generates a bounding box around each detected object, as well as a classifier corresponding to each detected object (e.g., bed, picture frame, potted plant, floor rug, etc.).

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is intended to be protected by Letter patent is set forth in the following claims.

What is claimed is:

1. A system for automatically classifying and processing objects present in images or videos, comprising:
   a memory; and
   a processor in communication with the memory, the processor:
      capturing an image or a video frame;
      classifying one or more objects present in the image or the video frame;
      adding the classified objects to an inventory;
      generating a set of fine-grained item codes related to the one or more classified objects, each of the fine-grained item codes indicative of different variations of possible residential item types corresponding to the one or more objects present in the image or the video frame; and
      transmitting the inventory and at least one of the set of fine-grained item codes to a server in communication with the processor, the inventory and at least one of the set of fine-grained item codes processed at the server to generate a completed inventory with associated pricing information.

2. The system of claim 1, wherein the processor:
   extracts still image or video frames from a live camera feed,
   resizes each of the still image or video frames based on a predetermined height and width, and
   classifies one or more objects present in the resized still image or video frames.

3. The system of claim 2, wherein the processor utilizes a tracking algorithm to track one or more objects moving through the live camera feed or appearing in and out of the live camera feed.

4. The system of claim 1, further comprising a convolutional neural network.

5. The system of claim 1, wherein the server is in communication with a pricing information database and the server determines a predetermined price of the classified object based on a user input and pricing information obtained from the pricing information database.

6. The system of claim 1, wherein the server transmits the processed inventory to a third party system.

7. The system of claim 1, wherein the processor utilizes a natural language processing algorithm to process audio data associated with the object present in the captured video frame.

8. A method for automatically classifying and processing an object present in an image or video comprising the steps of:
   capturing an image or a video frame;
   classifying one or more objects present in the images or the video frame;
   adding the classified objects to an inventory;
   generating a set of fine-grained item codes related to the one or more classified objects, each of the fine-grained item codes indicative of different variations of possible residential item types corresponding to the one or more objects present in the image or the video frame; and
   transmitting the inventory and at least one of the set of fine-grained item codes to a server in communication with the processor, the inventory and at least one of the set of fine-grained item codes processed at the server to generate a completed inventory with associated pricing information.

9. The method of claim 8, further comprising the steps of:
   extracting still image or video frames from the live camera feed,
   resizing each of the still image or video frames based on a predetermined height and width, and
   classifying one or more objects present in the resized still image or video frames.

10. The method of claim 9, further comprising the step of utilizing a tracking algorithm to track one or more objects moving through the live camera feed or appearing in and out of the live camera feed.

11. The method of claim 8, wherein said classification step is performed using a convolutional neural network.

12. The method of claim 8, wherein the server is in communication with a pricing information database and further comprising the step of modifying, by the server, the predetermined price of the classified object based on a user input and pricing information obtained from the pricing information database.

13. The method of claim 8, further comprising the step of transmitting, by the server, the processed inventory to a third party system.

14. The method of claim 8, further comprising the step of utilizing a natural language processing algorithm to process audio data associated with the object present in the captured video frame.

15. A non-transitory computer readable medium having instructions stored thereon for automatically classifying and processing an object present in an image or a video which, when executed by a processor, causes the processor to carry out the steps of:

capturing an image or a video frame;

classifying one or more objects present in the images or the video frame;

adding the classified objects to an inventory;

generating a set of fine-grained item codes related to the one or more classified objects, each of the fine-grained item codes indicative of different variations of possible residential item types corresponding to the one or more objects present in the image or the video frame; and transmitting the inventory and at least one of the set of fine-grained item codes to a server in communication with the processor, the inventory and at least one of the set of fine-grained item codes processed at the server to generate a completed inventory with associated pricing information.

16. The non-transitory computer readable medium of claim 15, the processor further carrying out the steps of:

extracts still image or video frames from the live camera feed, resizes each of the still image or video frames based on a predetermined height and width, and classifies one or more objects present in the resized still image or video frames.

17. The non-transitory computer readable medium of claim 16, the processor further carrying out the step of utilizing a tracking algorithm to track one or more objects moving through the live camera feed or appearing in and out of the live camera feed.

18. The non-transitory computer readable medium of claim 15, wherein the server is in communication with a pricing information database and the server modifies the predetermined price of the classified object based on a user input and pricing information obtained from the pricing information database.

19. The non-transitory computer readable medium of claim 15, the processor further carrying out the step of utilizing a natural language processing algorithm to process audio data associated with the object present in the captured video frame.

* * * * *